(12) United States Patent
Zhang et al.

(10) Patent No.: US 10,536,187 B2
(45) Date of Patent: *Jan. 14, 2020

(54) COMPLEMENTARY METAL OXIDE SEMICONDUCTOR DIFFERENTIAL ANTENNA TRANSMIT-RECEIVE SWITCHES WITH POWER COMBINING CIRCUITRY FOR ORTHOGONAL FREQUENCY-DIVISION MULTIPLEXING SYSTEMS

(71) Applicant: Skyworks Solutions, Inc., Woburn, MA (US)

(72) Inventors: Lisette L. Zhang, Irvine, CA (US); Oleksandr Gorbachov, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,075

(22) Filed: Aug. 2, 2018

(65) Prior Publication Data
US 2018/0343029 A1    Nov. 29, 2018

Related U.S. Application Data

(63) Continuation of application No. 15/266,258, filed on Sep. 15, 2016, now Pat. No. 10,044,400, which is a (Continued)

(51) Int. Cl.
*H04B 1/44* (2006.01)
*H04B 1/46* (2006.01)
(Continued)

(52) U.S. Cl.
CPC .............. *H04B 1/48* (2013.01); *H04B 1/006* (2013.01)

(58) Field of Classification Search
CPC ... H04B 1/16; H04B 1/40; H04B 1/44; H04B 1/48; H04B 5/02; H04B 5/0075; H03F 1/223; H03F 1/565; H03F 3/193; H03F 3/505; H03F 2200/537; H03F 2200/541; H01P 1/10; H01P 5/10
(Continued)

(56) References Cited

U.S. PATENT DOCUMENTS 7,120,399 B2    10/2006    Khorram
7,446,626 B2    11/2008    Gorbachov
(Continued)

*Primary Examiner* — Quochien B Vuong
(74) *Attorney, Agent, or Firm* — Stetina Brunda Garred & Brucker

(57) ABSTRACT

A radio frequency (RF) transmit-receive switch has an antenna port, first and second transmit differential ports and first and second receive differential ports. Transmit transistor switches are connected to the transmit differential ports. Primary and secondary windings of a transmit coupled inductor transformer are connected to the transmit transistor switches. Receive transistor switches are connected to the receive differential ports. Primary and secondary windings of a receive coupled inductor transformer are connected to the receive transistor switches. A first balun inductive winding is connected to the antenna port, and a second balun inductive winding is connected to the transistor switches.

20 Claims, 17 Drawing Sheets

Related U.S. Application Data continuation of application No. 14/810,943, filed on Jul. 28, 2015, now Pat. No. 9,450,639.

(60) Provisional application No. 62/029,882, filed on Jul. 28, 2014.

(51) Int. Cl.
*H04B 1/48* (2006.01)
*H04B 1/00* (2006.01)

(58) Field of Classification Search
USPC ............ 455/78, 82, 83; 333/101, 112, 124; 370/278, 282
See application file for complete search history.

(56) References Cited

U.S. PATENT DOCUMENTS

| | | | |
|---|---|---|---|
| 7,865,149 B2 | 1/2011 | Han et al. | |
| 8,103,221 B2 | 1/2012 | Ta et al. | |
| 8,135,357 B1 | 3/2012 | Chang et al. | |
| 8,270,926 B2* | 9/2012 | Roufoogaran | H04B 1/0458 330/305 |
| 8,907,745 B2 | 12/2014 | Grondahl et al. | |
| 9,093,734 B2 | 7/2015 | Gorbachov | |
| 9,148,137 B2 | 9/2015 | van Wanum | |
| 9,293,797 B2 | 3/2016 | Kim et al. | |
| 9,484,977 B2* | 11/2016 | Anderson | H04B 1/44 |
| 2005/0037800 A1* | 2/2005 | Shih | H04B 1/005 455/550.1 |
| 2009/0251221 A1 | 10/2009 | Gorbachov | |

\* cited by examiner

COMPLEMENTARY METAL OXIDE SEMICONDUCTOR DIFFERENTIAL ANTENNA TRANSMIT-RECEIVE SWITCHES WITH POWER COMBINING CIRCUITRY FOR ORTHOGONAL FREQUENCY-DIVISION MULTIPLEXING SYSTEMS

CROSS-REFERENCE TO RELATED APPLICATIONS

This application is a continuation of U.S. patent application Ser. No. 15/266,258 filed Sep. 15, 2016 and entitled "COMPLEMENTARY METAL OXIDE SEMICONDUCTOR DIFFERENTIAL ANTENNA TRANSMIT-RECEIVE SWITCHES WITH POWER COMBINING CIRCUITRY FOR ORTHOGONAL FREQUENCY-DIVISION MULTIPLEXING SYSTEMS," which is a continuation patent application of U.S. patent application Ser. No. 14/810,943 filed Jul. 28, 2015 and issued as U.S. Pat. No. 9,450,639 on Sep. 20, 2016 and entitled "COMPLEMENTARY METAL OXIDE SEMICONDUCTOR DIFFERENTIAL ANTENNA TRANSMIT-RECEIVE SWITCHES WITH POWER COMBINING CIRCUITRY FOR ORTHOGONAL FREQUENCY-DIVISION MULTIPLEXING SYSTEMS," which relates to and claims the benefit of U.S. Provisional Application No. 62/029,882 filed Jul. 28, 2014 and entitled "CMOS DIFFERENTIAL ANTENNA TRANSMIT-RECEIVE SWITCHES WITH POWER COMBINING CIRCUITRY FOR OFDM SYSTEM" the disclosure of each of which is wholly incorporated by reference in their entirety herein.

STATEMENT RE: FEDERALLY SPONSORED RESEARCH/DEVELOPMENT

Not Applicable

BACKGROUND

1. Technical Field

The present disclosure relates generally to radio frequency (RF) communications switch devices, and in particular, complementary metal oxide semiconductor (CMOS) differential antenna transmit-receive switches with power combining circuitry for orthogonal frequency-division multiplexing (OFDM) systems.

2. Related Art

Generally, wireless communications involve a radio frequency (RF) carrier signal that is variously modulated to represent data, and the modulation, transmission, receipt, and demodulation of the signal conform to a set of standards for coordination of the same. Many different mobile communication technologies or air interfaces exist, including GSM (Global System for Mobile Communications), EDGE (Enhanced Data rates for GSM Evolution), and UMTS (Universal Mobile Telecommunications System) W-CDMA (Wideband Code Division Multiple Access). More recently, 4G (fourth generation) technologies such as LTE (Long Term Evolution), which is based on the earlier GSM and UMTS standards, are being deployed. Besides these mobile communications modalities, there are local area data networking modalities such as Wireless LAN (WLAN)/WiFi, WiMax, and so forth.

A fundamental component of any wireless communications system is the transceiver, that is, the combined transmitter and receiver circuitry. The transceiver encodes the data to a baseband signal and modulates it with an RF carrier signal. Upon receipt, the transceiver down-converts the RF signal, demodulates the baseband signal, and decodes the data represented by the baseband signal. An antenna connected to the transmitter converts the electrical signals to electromagnetic waves, and an antenna connected to the receiver converts the electromagnetic waves back to electrical signals.

Depending on the particulars of the communications modality, single or multiple antennas may be utilized. The output of the transmitter is connected to a power amplifier, which amplifies the RF signals prior to transmission via the antenna. The receiver is connected to the output of a low noise amplifier, the input of which is connected to the antenna and receives inbound RF signals. A transmit/receive switch selectively interconnects the antenna to the output of the power amplifier during transmission, and to the input of the low noise amplifier during reception. Thus, the power amplifier, the low noise amplifier, and the antenna switch serves as key building blocks in RF transceiver circuitry. These components may be referred to as a front end circuit.

Conventionally, in order to lower manufacturing costs and allow full integration of a complete RF System-on-Chip (SoC), a complementary metal oxide semiconductor (CMOS) technology is utilized for the power amplifier and the antenna switch circuitry. SoC devices with integrated front end circuits intended for mobile communications applications require both a high sensitivity receiver, a power amplifier with a low error vector magnitude (EVM) floor, and a local oscillator, all on a single semiconductor die. Local oscillator pulling and substrate noise coupling render differential amplifiers a robust choice, and small form factor integrated circuits suitable for mobile applications are possible with differential circuits that incorporate coupled inductors.

Existing transmit/receive or antenna switches are implemented in CMOS technology with series-shunt NMOS (n-type metal oxide semiconductor) transistors in the transmit and receive paths to the antenna. The series switch either passes or blocks the respective signal path. The shunt switch grounds the undesired signal and isolates the downstream component, but there is an associated increase in insertion loss. Another approach involves utilizing a resonant inductor with the switch in the off state to achieve a higher impedance as seen by the antenna.

However, there are several inherent limitations associated with CMOS switch devices. One of the most significant is low breakdown voltage, which is exacerbated by the trend towards SoC devices utilizing standard nanometer processes, together with increases in output power. Additionally, balun and transformers with ultra-high coupling factors have been difficult to produce using standard CMOS processes. It may be possible to utilize dual or multi-integrated circuit device MIMO (multiple input, multiple output) front end circuit, but such an implementation results in greatly increased costs.

Accordingly, there is a need in the art for a differential front end architecture that can reduce voltage stress across a CMOS switch. There is a need for such voltage stress to be reduced by half for the same transmitted power at the antenna.

BRIEF SUMMARY

This disclosure is directed to architectures and circuitry of a low insertion loss single pole, double throw (SP2T) and single pole, triple throw (SP3T) switches that are fabricated with pure CMOS processes. With an out-of-phase, 2× or 4× power combining techniques, the same power level in an otherwise significantly more expensive MIMO front end circuits is possible. Additionally, these circuits are also understood to transform the impedance to match with a 50 Ohm antenna, as well as incorporate electrostatic discharge (ESD) protection circuitry in and around the fully differential transmitter/receiver switches. Transformer-based power combining may be utilized to achieve high linear power while avoiding CMOS device breakdown.

The various embodiments of a radio frequency (RF) transmit-receive switch may have an antenna port, first and second transmit differential ports and first and second receive differential ports. The transmit-receive switch may include a first transmit transistor switch that is connected to the first transmit differential port, and a second transmit transistor switch that is connected to the second transmit differential port. There may also be a transmit coupled inductor transformer that has a pair of primary terminals connected across the first transmit transistor switch and a pair of secondary terminals connected across the second transmit transistor switch.

In another embodiment, the transmit-receive switch may incorporate a first power amplifier output stage that is connected to the first transmit differential port, as well as a second power amplifier output stage that is connected to the second transmit differential port. There may be a transmit coupled inductor transformer with a pair of primary terminals connected across the first power amplifier output stage and a pair of secondary terminals connected across the second power amplifier output stage.

The transmit-receive switch may also incorporate a first receive transistor switch that is connected to the first receive differential port, and a second receive transistor switch that is connected to the second receive differential port. There may be a receive coupled inductor transformer that includes a pair of primary terminals connected across the first receive transistor switch and a pair of secondary terminals connected across the second receive transistor switch.

The transmit-receive switch may also include a balun with a first balun inductive winding and a second balun inductive winding. The first balun inductive winding may be connected to the antenna port. The second balun inductive winding may be defined by a first end connected to the first transmit transistor switch or the first power amplifier output stage, and the first receive transistor switch. The second balun inductive winding may further be defined by a second end that is connected to the second transmit transistor switch or the second power amplifier output stage and the second receive transistor switch.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings.

Common reference numerals are used throughout the drawings and the detailed description to indicate the same elements.

DETAILED DESCRIPTION

The detailed description set forth below in connection with the appended drawings is intended as a description of the presently preferred embodiments of differential antenna transmit-receive switches with power combining circuitry for orthogonal frequency division multiplexing (OFDM) systems. It is not intended to represent the only form in which the present invention may be developed or utilized, and the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
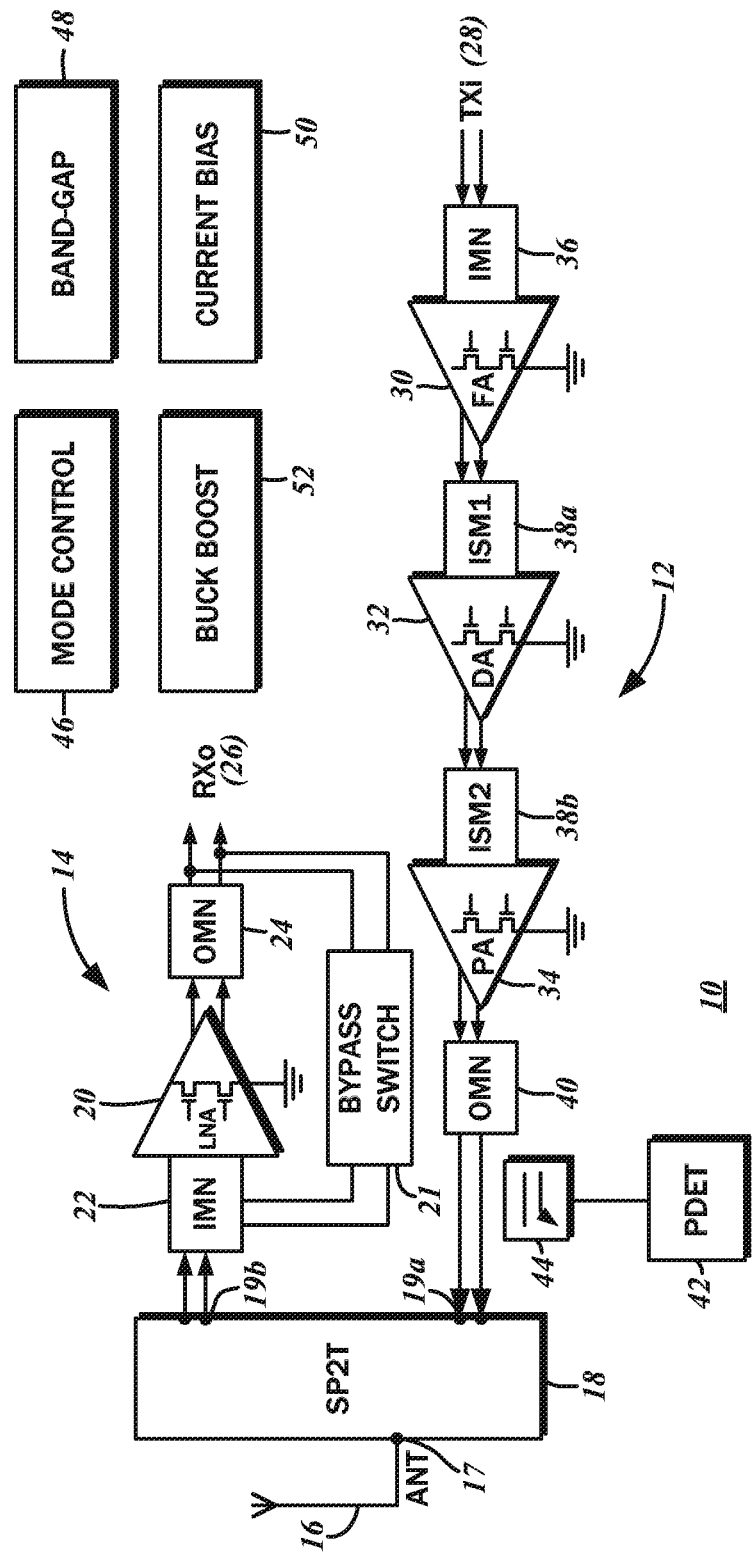
FIG. 1 is a circuit block diagram showing an exemplary System on Chip (SoC) 802.11ac wireless local area networking (WLAN) transceiver front end circuit with differential power amplifiers, low noise amplifiers, and antenna switches.

FIG. 1 shows an exemplary radio frequency (RF) front end circuit 10, in which various embodiments of the transmit-receive switches of the present disclosure may be utilized. The front end circuit 10 may be configured for an IEEE 802.11ac wireless data networking system. Some embodiments of the disclosed switch are configured specifically for operation in the 2.4 GHz ISM (Industrial Scientific Medical) frequency band, while others are configured for operation in the 5 GHz ISM frequency band. Those having ordinary skill in the art will recognize that the presently disclosed embodiments may be adapted for operation with other RF communications systems such as WCDMA, LTE, GSM, and so forth that may utilize different operating frequencies.

The front end circuit 10 is generally defined by a transmit chain 12 and a receive chain 14. An antenna 16 is connected to the front end circuit 10, and more particularly, selectively connected to the transmit chain 12 and the receive chain 14 therefrom with an RF transmit-receive switch 18. According to the illustrated embodiment, the connected transceiver is fully differential, while the antenna 16 is single-ended. As such, the entire signal path, including the components comprising such signal path, are understood to be differential and therefore comprised of two signal transmission lines.

In accordance with one embodiment, the front end circuit 10 has one transmit chain 12 and one receive chain 14, so the RF transmit-receive switch 18 is a single pole, double throw type. The RF transmit-receive switch 18 is defined by a single-ended port 17 tied to the antenna 16, a first differential port pair 19a tied to the transmit chain 12, and a second differential port pair 19b tied to the receive chain 14. During a receive mode, the antenna 16 is connected to the receive chain 14, that is, within the RF transmit-receive switch 18, the single-ended port 17 is electrically connected to the second differential port pair 19b. Along these lines, during a transmit mode, the antenna 16 is connected to the transmit chain 12, that is, the single-ended port 17 is electrically connected to the first differential port pair 19a.

When a signal is being received, the receive chain 14 is activated. In further detail, the receive chain 14 includes a low noise amplifier 20, as well as a bypass mode switch 21. Additionally, the low noise amplifier 20 is connected to an input matching network 22 that impedance matches the low noise amplifier 20 to the antenna 16, as well as an output matching network 24, which impedance matches the low noise amplifier 20 to the input of a transceiver circuit. Relative to the front end circuit 10, an output port 26 of the receive chain 14 is denoted as RXo, that is, the receive output.

A transmission signal generated by the transceiver circuit and fed to the transmit chain 12, is received at a transmit input port 28 thereof, which is denoted as TXi. The transmit chain 12 is comprised of multiple amplification stages, including a first amplifier 30, a driver amplifier 32, and a power amplifier 34, all of which may also be collectively referred to as a power amplifier. Any number of stages may be utilized according to the specific output power and overall gain needs of the application. The first amplifier 30 includes an input matching network 36 that impedance matches the first amplifier 30 to the output of the transceiver circuit. The inputs to the driver amplifier 32 and to the power amplifier 34 include respective intermediate stage matching circuits 38a, 38b, respectively, and the output of the power amplifier 34 has an output matching network 40 that impedance matches the power amplifier to the antenna 16.

The output power of RF emissions is closely regulated during operation so that permitted maximums are not exceeded. Thus, the front end circuit 10 includes a power detector 42 for this purpose. The output from the power amplifier 34 is passed to the power detector 42 via a directional coupler 44, as well as to the RF transmit-receive switch 18 that passes the signal to the antenna 16.

The directional coupler 44 may be a lossless type such as the one disclosed in co-pending U.S. patent application Ser. No. 14/805,383 that is commonly assigned to the assignee of the present application and entitled ZERO INSERTION LOSS DIRECTIONAL COUPLER FOR WIRELESS TRANSCEIVERS WITH INTEGRATED POWER AMPLIFIERS, the entirety of the disclosure of which is wholly incorporated by reference herein. As will be recognized by those having ordinary skill in the art, the directional coupler 44 may be located in close physical proximity to the signal path of the power amplifier 34 output. The directional coupler 44 has an isolation port that can be connected to a complex impedance in order to compensate for the non-ideal reflection coefficient (S22) and non-ideal coupler directivity to improve output power over varying antenna voltage standing wave ratios (VSWR). A detector port of the directional coupler 44 is, in turn, connected to the power detector 42, which correctly indicates the forward power to the antenna 16 regardless of the variations in load impedance.

Again, although the receive chain 14 is shown with a single stage amplifier and the transmit chain 12 is shown with three amplifier stages, these are by way of example only and not of limitation. Any number of amplification stages may be utilized for the various transmit and receive chains of either of the operating frequencies.

In addition to the foregoing components, the front end circuit 10 may also include a mode control logic module 46, a bandgap current reference generator 48, a low drop-out voltage regulator (LDO) 50, and a buck-boost DC to DC converter 52, as needed. These components are understood to control the operation of the RF transmit-receive switch 18 by generating proper logic control voltage levels, as well as protect the logic transistor from high over-voltage damage. Additional details of these components will be described more fully below, in the context of the various embodiments of the RF transmit-receive switch 18 of the present disclosure.

Figure 2:
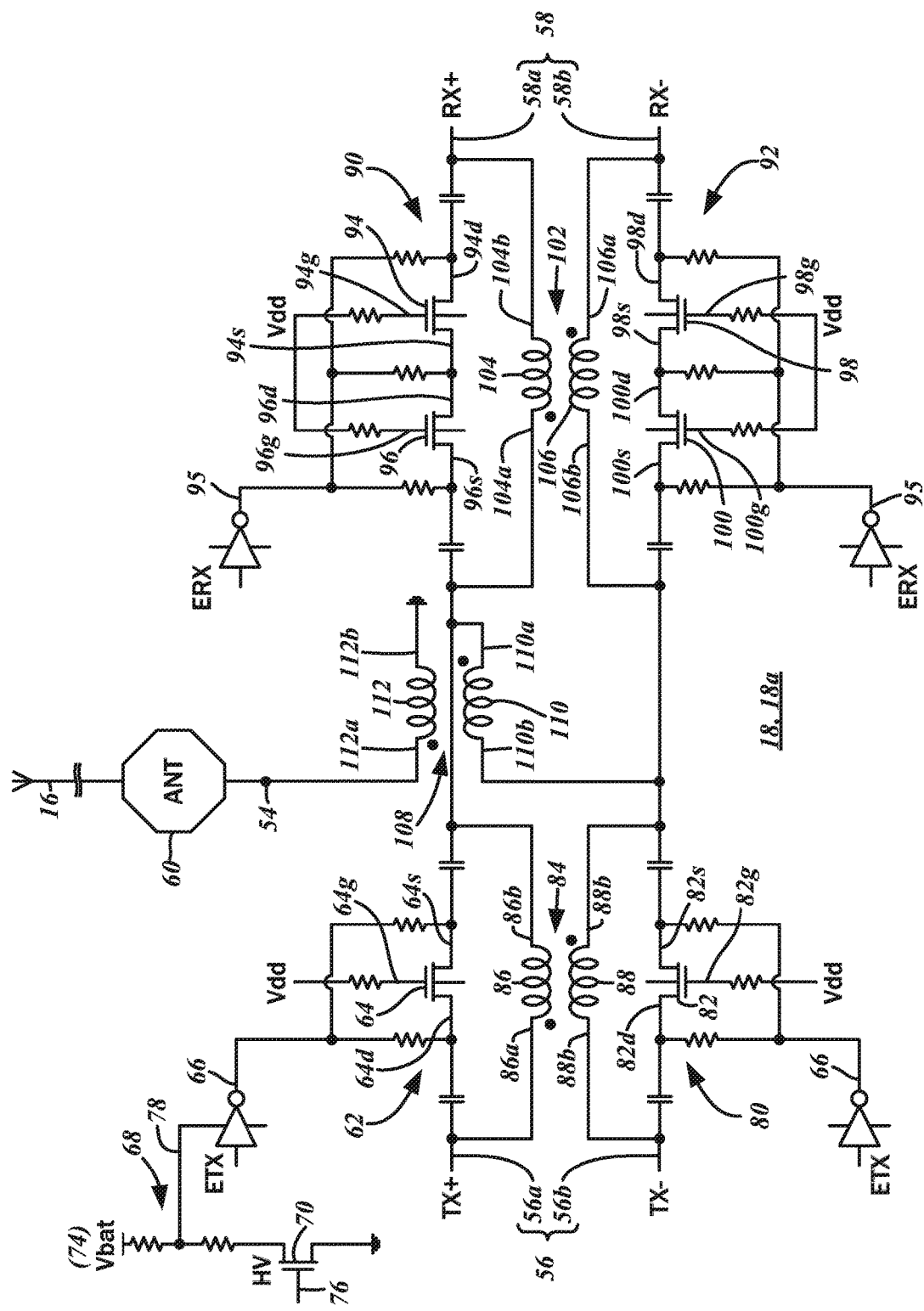
FIG. 2 is a schematic diagram of a radio frequency (RF) transmit-receive switch in accordance with a first embodiment of the present disclosure.

The schematic diagram of FIG. 2 is of a first embodiment of the RF transmit-receive switch 18a, which can be generally characterized as a single pole, double throw switch that selectively connects the antenna 16 to the aforementioned transmit chain 12 and the receive chain 14 shown in the block diagram of FIG. 1. As will be described in further detail below, the RF transmit-receive switch 18 combines pass, rejection, and impedance transformation functions into a single component, and is understood to be characterized by high linearity and high power handling capability. The exemplary first embodiment of the RF transmit-receive switch 18a is configured for use in connection with an 802.11ac WiFi transceiver, and specifically, with the 5 GHz operating frequency.

The first embodiment of the RF transmit-receive switch 18a includes an antenna port 54, as well as a pair of transmit differential ports 56a, 56b, and a pair of receive differential ports 58a, 58b. The first transmit differential port 56a is understood to be connected to the (+) differential signal transmission line from the power amplifier 34, while the second transmit differential port 56b is understood to be connected to the (−) differential signal transmission line from the power amplifier 34. The transmit (+) differential signal is designated as TX+, and the transmit (−) differential signal is designated as TX−.

Along these lines, the first receive differential port 58a is understood to be connected to the (+) differential signal transmission line to the low noise amplifier 20, and the second receive differential port 58b is connected to the (−) differential signal transmission line to the low noise amplifier 20. The receive (+) differential signal is designated as RX+, and the receive (−) differential signal is designated as RX−.

The single-ended antenna port 54 of the RF transmit-receive switch 18 is connected to an antenna pad 60 disposed on the semiconductor substrate. The antenna 16, which is understood to be external to the RF transmit-receive switch 18, is connected to the antenna pad 60.

The first embodiment of the RF transmit-receive switch 18a includes a first transmit transistor switch 62 that is connected to the first transmit differential port 56a. More particularly, the first transmit transistor switch 62 includes a transistor 64 with a gate 64g, a source 64s, and a drain 64d. The drain 64d of the transistor 64 is connected to the first transmit differential port 56a. Additionally, the gate 64g is connected to the power supply voltage Vdd, and the source 64s and the drain 64d are connected to the output of the mode control logic module 46 described above with reference to FIG. 1, specifically a transmit mode activation output ETX 66 thereof. One of the inputs to the mode control logic module 46 is from a power supply tracking and sensing circuit 68.

Figure 3:
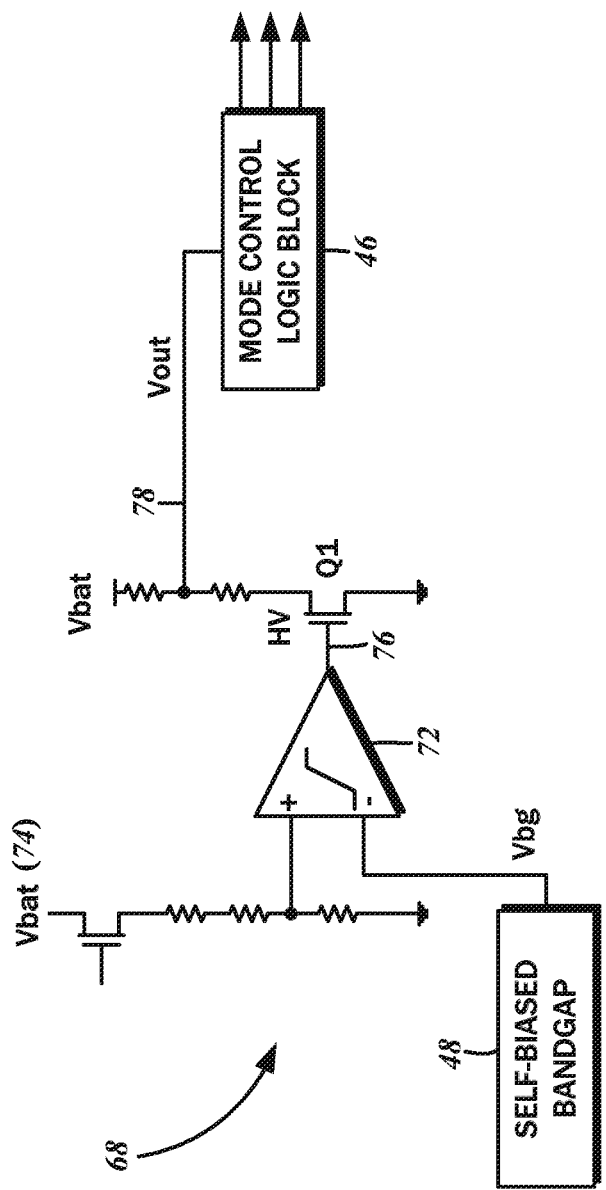
FIG. 3 is a circuit block diagram of a power supply tracking and sensing circuit that may control a transmit-receive switch in accordance with various embodiments of the present disclosure.

With additional reference to the schematic diagram of FIG. 3, one implementation of the power supply tracking and sensing circuit 68 incorporates a comparator 72 that compares a fraction of a battery supply voltage (Vbatt) 74 with a bandgap voltage as generated by the bandgap current reference generator 48. When the battery voltage Vbatt 74 is higher than the single transistor breakdown voltage, a signal HV 76 is set to "high" and the output voltage Vout 78 becomes a fraction of Vbatt 74, with the transistor Q1 70 being in the on state. If the switching transistor breakdown voltage is higher than the predefined battery supply voltage Vbatt 74, the signal HV 76 is set to "low" and the output voltage Vout 78 is equal to the battery supply voltage Vbatt 74 with the transistor Q1 70 being in the off state. This voltage is used for all logic control voltage supplies Vdd.

The first embodiment of the RF transmit-receive switch 18a also includes a second transmit transistor switch 80 connected to the second transmit differential port 56b. The second transmit transistor switch 80 includes a transistor 82 also with a gate 82g, a drain 82d, and a source 82s, and the drain 82d is connected to the second transmit differential port 56b. The gate 82g is connected to the power supply voltage Vdd, while the source 64s and the drain 64d are connected to the transmit mode activation output ETX 66 of the mode control logic module 46.

The first embodiment of the RF transmit-receive switch 18a incorporates a transmit coupled inductor transformer 84 which is generally comprised of a primary winding 86 and a secondary winding 88 that are electromagnetically coupled to each other. Both the primary winding 86 and the secondary winding 88 are comprised of a plurality of turns, and are electromagnetically cross-coupled. According to one embodiment, the number of turns in the primary winding 86 and the secondary winding 88 are equal.

The transmit coupled inductor transformer 84, as well as the other coupled inductor transformers utilized in the various embodiments of the RF transmit-receive switch 18, may be configured as disclosed in co-pending and co-owned U.S. patent application Ser. No. 14/805,368, entitled ULTRA-HIGH COUPLING FACTOR MONOLITHIC TRANSFORMERS FOR INTEGRATED DIFFERENTIAL RADIO FREQUENCY AMPLIFIERS IN SYSTEM-ON-CHIP DEVICES, the entirety of the disclosure of which is hereby wholly incorporated by reference. As discussed therein, the winding structures make ultra high coupling factors approaching 0.988 are possible on 10 Ohm·cm substrates with a bulk CMOS 40 nm process. The coupled inductor transformer is contemplated to have a compact, small form factor, as well as low insertion loss and robust electrostatic discharge (ESD) protection.

In further detail, the primary winding 86 has one end that corresponds to a first primary terminal 86a and another end that corresponds to a second primary terminal 86b. The primary winding 86 is connected across the source 64s and the drain 64d of the transistor 64, and specifically to the second primary terminal 86b and the first primary terminal 86a, respectively. The secondary winding 88 likewise has one end that corresponds to a first secondary terminal 88a and another end that corresponds to a second secondary terminal 88b. The secondary winding 88 is connected across the source 82s and the drain 82d of the transistor 82, that is, the first secondary terminal 88a of the secondary winding 88 is connected to the drain 82d of the transistor 82, and the second secondary terminal 88b of the secondary winding 88 is connected to the source 82s of the transistor 82.

Connected to the aforementioned receive differential ports 58 are a pair of receive transistor switches that connect the antenna port 54 to the differential signal outputs to the low noise amplifier. More particularly, there is a first receive transistor switch 90 that is connected to the first receive differential port 58a, and a second receive transistor switch 92 that is connected to the second receive differential port 58b.

The first receive transistor switch 90 has a first transistor 94 that is cascaded with a second transistor 96. In this regard, the source 94s of the first transistor 94 is connected to the drain 96d of the second transistor 96. Furthermore, the drain 94d of the first transistor 94 is connected to the first receive differential port 58a. Connected across the source and drain of both of the first and second transistors 94, 96 is a receive mode activation output ERX 95 thereof. The gates 94g, 96g are both connected to the power supply voltage Vdd.

The second receive transistor switch 92 has the same configuration as the first receive transistor switch 90, though as mentioned above, it is connected to the second receive differential port 58b. Accordingly, there is a first transistor 98 with a gate 98g, a source 98s, and a drain 98d, as well as a second transistor 100 with a gate 100g, a source 100s, and a drain 100d. Again, the second transistor 100 is cascaded with the first transistor 98, where the source 98s of the first transistor 98 is connected to the drain 100d of the second transistor 100. Furthermore, the gate 98g of the first transistor 98 and the gate 100g of the second transistor 100 are both connected to the power supply voltage Vdd, while the source 98s and the drain 98d of the first transistor 98, and the source 100s and the drain 100d of the second transistor 100 are each connected to the receive mode activation output ERX 95.

There is a receive coupled inductor transformer 102 that is generally comprised of a primary winding 104 and a secondary winding 106 that are electromagnetically cross-coupled to each other. The primary winding 86 and the secondary winding 88 are comprised of a plurality of turns, and in one embodiment, the number of turns is equal. The primary winding 104 has one end that corresponds to a first primary terminal 104a and another end that corresponds to a second primary terminal 104b. The primary winding 104 is connected across the drain 94d of the first transistor 94 and the source 96s of the second transistor 96, and specifically to the second primary terminal 104b and the first primary terminal 104a, respectively. The secondary winding 106 has one end that corresponds to a first secondary terminal 106a and another end that corresponds to a second secondary terminal 106b. The secondary winding 106 is connected across the drain 98d of the first transistor 98 and the source 100s of the second transistor 100. In particular, the first secondary terminal 106a of the secondary winding 106 is connected to the drain 98d of the first transistor 98, and the second secondary terminal 106b of the secondary winding 106 is connected to the source 100s of the second transistor 100.

According to various embodiments of the present disclosure, a balun 108 couples the transistor switches to the antenna port 54. The configuration of the balun 108 is also set forth in the aforementioned U.S. patent application Ser. No. 14/805,368, and comprised of a primary winding 110 and a secondary winding 112. Although the number of turns of the primary winding 110 and the secondary winding 112 are understood to be equal, impedance transformation may be possible with different primary to secondary winding ratios. The balun 108 is also understood to convert the differential signal to a single-ended output, and combine the output power of differential signals into a single 50 Ohm antenna. Whether an impedance transformation is necessary may depend on the output power and the number of other RF transmit-receive switches 18 utilized for delivering the specified power.

The primary winding 110 of the balun 108 is connected across the first and second transistor switches of the transmit and receive chain, that is, a first terminal 110a of the primary winding 110 is connected to the first transmit transistor switch 62, specifically the source 64s of the transistor 64, and the first receive transistor switch 90, specifically the source 96s of the second transistor 96. Moreover, a second terminal 110b of the primary winding 110 is connected to the second transmit transistor switch 80, specifically the source 82s of the transistor 82, and the second receive transistor switch 92, specifically the source 100s of the second transistor 100. The first terminal 112a of the secondary winding 112 is connected to the antenna port 54, while the second terminal 112b of the secondary winding 112 is connected to ground.

The balun 108 is understood to be fabricated with an ultra-thick metal, top metal, and redistribution layer (RDL) in a conventional bulk-CMOS semiconductor process. This is envisioned to maximize the Q-factor of the transformer, along with minimal insertion loss. These factors are understood to be important for high power added efficiency, handle high linear output power from the power amplifiers 34, and minimal noise figures with respect to the low noise amplifier 20. Along these lines, the various components of the RF transmit-receive switch 18, along with the rest of the components of the System-on-Chip (SoC), may be fabricated with conventional bulk CMOS processes. However, it is understood that any other suitable semiconductor process may be substituted without departing from the disclosure. These include CMOS silicon-on-insulator (SOI), silicon-germanium heterojunction bipolar transistor (SiGe HBT), gallium-arsenide (GaAs) and so forth.

The first embodiment of the RF transmit-receive switch 18a may be operated in different ways, that is, the various transistor switches may be selectively activated to implement transmit and receive functions, though some involve trade-offs between power amplifier linear power output versus low noise amplifier noise figure. In accordance with one embodiment, during a receive mode, the first receive transistor switch 90 and the second receive transistor switch 92 may be activated. In this embodiment, during a transmit mode, the first receive transistor switch 90 and the second receive transistor switch 92 are deactivated. A parallel resonance may be created by the inductance associated with the receive coupled inductor transformer 102, and the capacitance of the switches as shown. The capacitors shown in FIG. 2 may serve DC decoupling purposes, as well as for the fine tuning of the performance of the transmit-receive switch 18.

Figure 4:
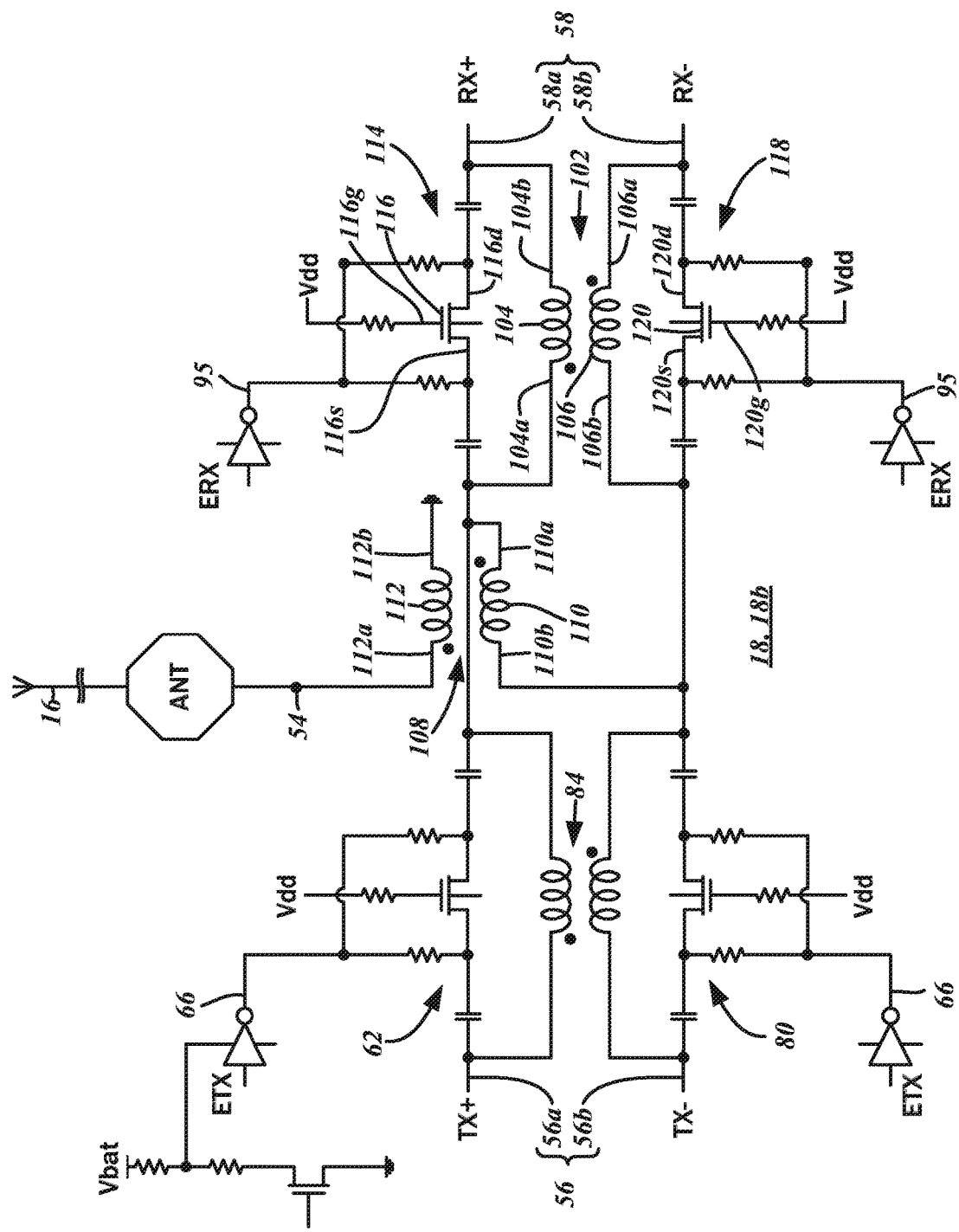
FIG. 4 is a schematic diagram of a second embodiment of the RF transmit-receive switch.

FIG. 4 depicts a second embodiment of the RF transmit-receive switch 18b with an alternative configuration that is likewise intended for a WiFi/802.11ac front end circuit. Like the first embodiment 18a, however, there is the antenna port 54, the transmit differential ports 56, and the receive differential ports 56. Furthermore, the second embodiment of the RF transmit-receive switch 18b also shares the same first transmit transistor switch 62 and the second transmit transistor switch 80, which are electromagnetically coupled with the transmit coupled inductor transformer 84. Additionally, the first transmit transistor switch 62 and the second transmit transistor switch 80 are controlled with the transmit mode activation output ETX 66.

The second embodiment of the RF transmit-receive switch 18b, however, incorporates a slightly different receive transistor switches. More particularly, there is a first receive transistor switch 114 that utilizes a single transistor 116, and a second receive transistor switch 118 with a single transistor 120. Thus, the receive transistor switches do not employ a cascaded transistor configuration. The transistor 116 includes a gate 116g that is connected to the power supply voltage Vdd, and both the source 116s and the drain 116d are connected to the receive mode activation output ERX 95 of the mode control logic module 46. Similarly, the transistor 120 includes a gate 120g connected to the power supply voltage Vdd, and both the source 120s and the drain 120d are connected to the receive mode activation output ERX 95.

The transistors 116, 120 are electromagnetically coupled with the receive coupled inductor transformer 102. The second primary terminal 104b of the primary winding 104 is connected to the drain 116d of the transistor 116, and the first primary terminal 104a of the primary winding 104 is connected to the source 116s of the transistor 116. Furthermore, the first secondary terminal 106a of the secondary winding 106 is connected to the drain 120d of the transistor 120, and the second secondary terminal 106b of the secondary winding 106 is connected to the source 120s of the transistor 120.

Again, the balun 108 couples the transistor switches to the antenna port 54. The primary winding 110 of the balun 108 is connected across the first and second transistor switches of the transmit and receive chain. The first terminal 110a of the primary winding 110 is connected to the first transmit transistor switch 62 and the first receive transistor switch 114, specifically the source 116s of the transistor 116. Moreover, a second terminal 110b of the primary winding 110 is connected to the second transmit transistor switch 80 and the second receive transistor switch 118, specifically the source 120s of the transistor 120. The first terminal 112a of the secondary winding 112 is connected to the antenna port 54, while the second terminal 112b of the secondary winding 112 is connected to ground.

With the second embodiment of the RF transmit-receive switch 18b, in the receive mode, the first transmit transistor switch 62 and the second transmit transistor switch 80 are deactivated, as well as the first receive transistor switch 114 and the second receive transistor switch 118 are activated. In this configuration, a low system noise figure is contemplated. Furthermore, in the transmit mode, the first transmit transistor switch 62 and the second transmit transistor switch 80 are activated, and the first receive transistor switch 114 and the second receive transistor switch 118 are deactivated. The deactivated first receive transistor switch 114 and the deactivated receive transistor switch 118, together with the inductance of the receive coupled inductor transformer 102 is understood to define a parallel resonance at the operating frequency in the transmit mode thus decoupling the transmit chain from being loaded by the receive chain. At the same time, the inductors of the primary winding 110 and the secondary winding 106 of the receive coupled inductor transformer balun 108 serve low noise amplifier input matching purposes in the receive the mode while transmit switches 62 and 80 are deactivated with a parallel resonance defined by coupled inductors 84 and these switches. The (−) transmit differential signal and the (+) transmit differential signal, which are out-of-phase relative to each other, and combined by the balun 108, with the total output power being doubled in the transmit mode.

Figure 5:
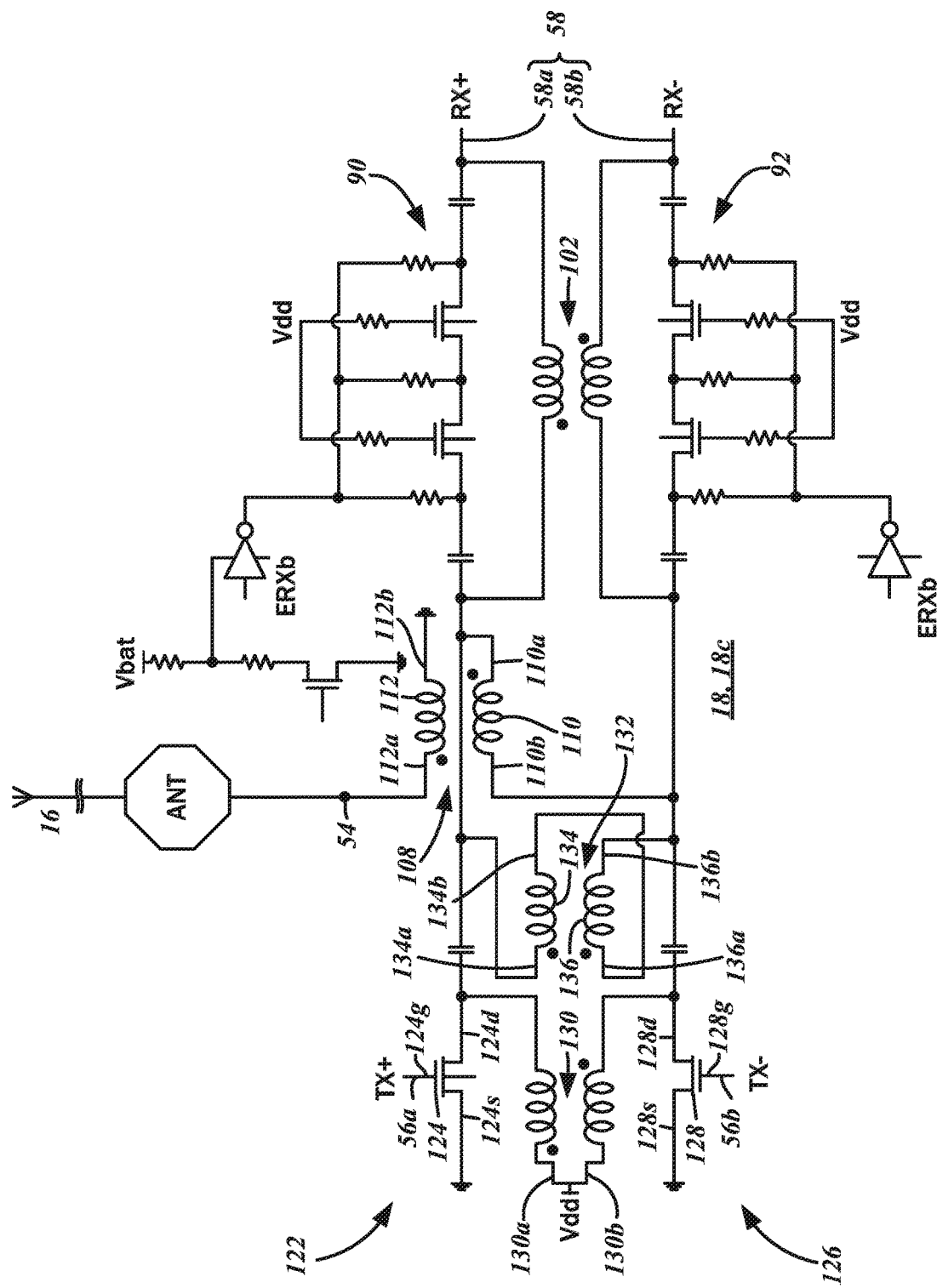
FIG. 5 is a schematic diagram of a third embodiment of the RF transmit-receive switch.

FIG. 5 is a schematic diagram of a third embodiment of the RF transmit-receive switch 18c, which includes the antenna port 54, the first transmit differential port 56a, the second transmit differential port 56b, the first receive differential port 58a, and the second receive differential port 58b. This architecture is likewise contemplated for WiFi 802.11/a/b/n/ac front end circuit, and is contemplated to maximum transmit linear power. The receive chain components of the third embodiment of the RF transmit-receive switch 18c are the same as the first embodiment of the RF transmit-receive switch 18a. That is, the same first receive transistor switch 90 and the second receive transistor switch 92 are electromagnetically coupled with the receive coupled inductor transformer 102. Accordingly, the details pertaining to these components will not be repeated.

The third embodiment of the RF transmit-receive switch 18c does not utilize switches in transmit chain. Instead, there are output stages of a differential power amplifier. There is a first power amplifier output stage 122 including a transistor 124 with a gate 124g, a source 124s, and a drain 124d. The gate 124g of the transistor 124 is connected to the first transmit differential port 56a, and the source 124s is connected to ground. This configuration is replicated for a second power amplifier output stage 126, which likewise includes a transistor 128 with a source 128s connected to ground, a gate 128g connected to the second transmit differential port 56b, and a drain 128d. The power supply voltage Vdd is connected to a transformer 130, specifically to a first winding 130a that is connected to the drain 124d of the transistor 124, and a second winding 130b that is connected to the drain 128d of the transistor 128.

An alternative configuration of a transmit coupled inductor transformer 132 is utilized in the third embodiment of the RF transmit-receive switch 18c. The transmit coupled inductor transformer 132 has a primary winding 134 with a first end corresponding to a first terminal 134a and a second end corresponding to a second terminal 134b. The first terminal 134a of the primary winding 134 is connected to the first power amplifier output stage 122, and specifically the drain 124d of the transistor 124. The transmit coupled inductor transformer 132 also has a secondary winding 136 with a first end corresponding to a first terminal 136a that is connected to the second power amplifier output stage 126, and specifically the drain 128d of the transistor 128. The second terminal 134b of the primary winding 134 is connected to the second terminal 136b of the secondary winding 136.

The balun 108 couples the power amplifier output stages 122 and 126, and the receive chain transistor switches 90 and 92 to the antenna port 54. The primary winding 110 of the balun 108 is connected across the first and second transistor switches of the transmit and receive chain. The first terminal 110a of the primary winding 110 is connected to the first power amplifier output stage 122 and the first receive transistor switch 90. The second terminal 110b of the primary winding 110 is connected to the second power amplifier output stage 126 and the second receive transistor switch 92, specifically the source 128s of the transistor 128. The first terminal 112a of the secondary winding 112 is connected to the antenna port 54, while the second terminal 112b of the secondary winding 112 is connected to ground. In the transmit mode, the power amplifier output stages 122 and 126 are activated, and the coupled inductors 130 and 132 serve as a load.

The third embodiment of the RF transmit-receive switch 18c can also be set to a transmit mode and a receive mode. In the receive mode, the first power amplifier output stage 122 and the second power amplifier output stage 126 are deactivated. The capacitance thereof, together with the inductance from the transmit coupled inductor transformers 130 and 132 are understood to define a parallel resonant circuit, thereby not loading the low noise amplifier input chain. In the transmit mode, the first receive transistor switch 90 and the second receive transistor switch 92 are deactivated, and the capacitances thereof, with the inductance from the receive coupled inductor transformer 102 is understood to define a parallel resonant circuit that prevents loading of the transmit output chain.

Figure 6:
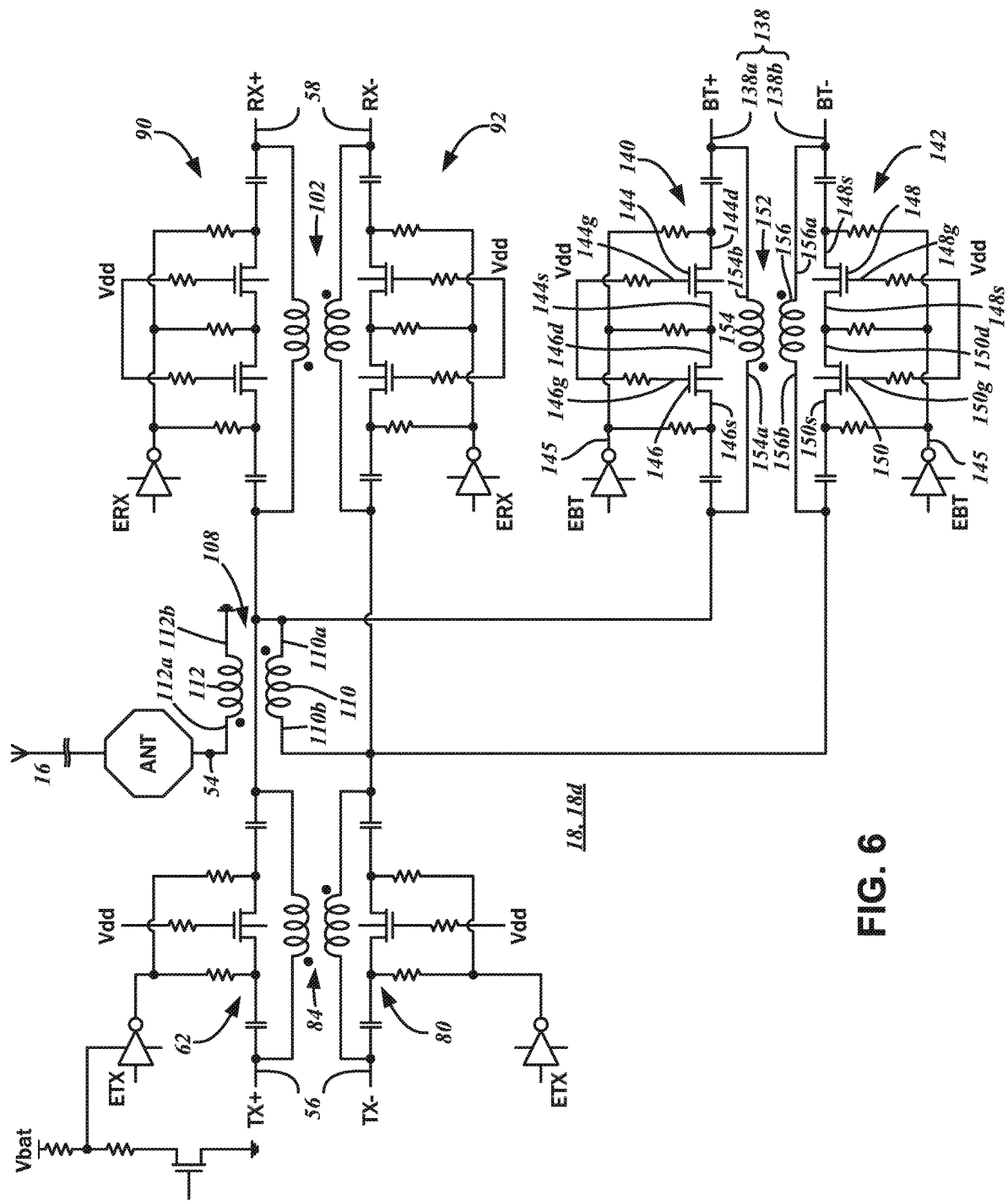
FIG. 6 is a schematic diagram of a fourth embodiment of the RF transmit-receive switch including a WiFi transmit differential port, a WiFi receive differential port, and a Bluetooth combined transmit and receive differential port.

With reference to FIG. 6, a fourth embodiment of the RF transmit-receive switch 18d is a single pole, triple throw (SP3T) type switch that selectively interconnects three differential ports to one single-ended antenna port 54. This embodiment is contemplated for a WiFi 802.11b/g/n and Bluetooth™ combined transceiver system. Accordingly, the fourth embodiment of the RF transmit-receive switch 18d has the transmit differential ports 56 and the receive differential ports 58 that are to be connected to the WiFi power amplifier outputs and the low noise amplifier inputs, respectively. There is also understood to be a first combined transmit-receive differential port 138a and a second combined transmit-receive differential port 138b for the Bluetooth™ input/output signal lines.

The WiFi transmit chain and receive chain components of the fourth embodiment of the RF transmit-receive switch 18d are the same as the first embodiment of the RF transmit-receive switch 18a. The same first transmit transistor switch 62 and second transmit transistor switch 80 are electromagnetically coupled with the transmit coupled inductor transformer 84. Additionally, the same first receive transistor switch 90 and second receive transistor switch 92 are electromagnetically coupled with the receive coupled inductor transformer 102.

The combined transmit-receive differential ports 138 are connected to a pair of combined transmit-receive switches that connect the antenna port 54 to the Bluetooth™ differential signal inputs and outputs. There is a first combined transmit-receive transistor switch 140 that is connected to the first combined transmit-receive differential port 138a, and a second combined transmit-receive transistor switch 142 that is connected to the second combined transmit-receive differential port 138b.

The first combined transmit-receive transistor switch 140 has a first transistor 144 that is cascaded with a second transistor 146. The source 144s of the first transistor 144 is connected to the drain 146d of the second transistor 146. Furthermore, the drain 144d of the first transistor 144 is connected to the first combined transmit-receive differential port 138a. Connected across the source and drain of both of the first and second transistors 144, 146 is a combined transmit-receive/Bluetooth™ mode activation output EBT 145. The gates 144g, 146g are both connected to the power supply voltage Vdd.

The second combined transmit-receive transistor switch 142 has the same configuration as the first combined transmit-receive transistor switch 140, though as mentioned above, it is connected to the second combined transmit-receive differential port 138b. There is a first transistor 148 with a gate 148g, a source 148s, and a drain 148d, as well as a second transistor 150 with a gate 150g, a source 150s, and a drain 150d. The second transistor 150 is cascaded with the first transistor 148, where the source 148s of the first transistor 148 is connected to the drain 150d of the second transistor 150. Furthermore, the gate 148g of the first transistor 148 and the gate 150g of the second transistor 150 are both connected to the power supply voltage Vdd, while the source 148s and the drain 148d of the first transistor 148, and the source 150s and the drain 150d of the second transistor 150 are each connected to the combined transmit-receive/Bluetooth™ mode activation output EBT 145.

There is a combined transmit-receive coupled inductor transformer 152 with a primary winding 154 and a secondary winding 156 that are electromagnetically cross-coupled to each other. The primary winding 154 and the secondary winding 156 are comprised of a plurality of turns, and the number of turns may be equal. The primary winding 154 has one end that corresponds to a first primary terminal 154a and another end that corresponds to a second primary terminal 154b. The primary winding 154 is connected across the drain 144d of the first transistor 144 and the source 146s of the second transistor 146, and specifically to the second primary terminal 154b and the first primary terminal 154a, respectively. The secondary winding 156 has one end that corresponds to a first secondary terminal 156a and another end that corresponds to a second secondary terminal 156b. The secondary winding 156 is connected across the drain 148d of the first transistor 148 and the source 150s of the second transistor 150. In particular, the first secondary terminal 156a of the secondary winding 156 is connected to the drain 148d of the first transistor 148, and the second secondary terminal 156b of the secondary winding 156 is connected to the source 150s of the second transistor 150. Of the transmit coupled inductor transformer 84, the receive coupled inductor transformer 102, and the combined transmit-receive coupled inductor transformer 152, the transmit coupled inductor transformer 84 is understood to have the highest inductance value.

As with the other embodiments of the RF transmit-receive switch 18, the balun 108 couples the transistor switches to the antenna port 54. The primary winding 110 of the balun 108 is connected across the first and second transistor switches of the transmit chain, receive chain, and combined transmit-receive/Bluetooth™ chain. The first terminal 110a of the primary winding 110 is connected to the first transmit transistor switch 62, the first receive transistor switch 90, and the first combined transmit-receive transistor switch 140, specifically, the source 146s of the second transistor 146 thereof. The second terminal 110b of the primary winding 110 is connected to the second transmit transistor switch 126, the second receive transistor switch 92, and the second combined transmit-receive transistor switch 142, specifically the source 150s of the second transistor 150. The first terminal 112a of the secondary winding 112 is connected to the antenna port 54, while the second terminal 112b of the secondary winding 112 is connected to ground.

A WiFi transmit, WiFi receive, and Bluetooth™ modes are contemplated in the fourth embodiment of the RF transmit-receive switch 18d. In the receive mode, with the first transmit transistor switch 62, the second transmit transistor switch 80, the first receive transistor switch 90, the second receive transistor switch 92, the first combined transmit-receive transistor switch 140, and the second combined transmit-receive transistor switch 142 being deactivated, an extremely low noise figure can be achieved. Furthermore, in a combined transmit-receive or Bluetooth™ mode, all of the switches can be deactivated, with the components being optimized for a very low insertion loss. As with the first embodiment of the RF transmit-receive switch 18a, the inductors associated with the receive coupled inductor transformer 102 is understood to have low noise input impedance matching functions.

In the WiFi receive mode, the deactivated transmit transistor switches 62, 80 and the combined transmit-receive transistor switches 140, 142 are understood to define a parallel resonance with corresponding inductors of the transmit coupled inductor transformer 84 and the combined transmit-receive coupled inductor transformer 152, respectively. The capacitance associated with these transistor switches 62, 80, 140, and 142 are also part of the defined parallel resonance.

In either the WiFi transmit mode or the Bluetooth™ mode, the respective transistor switches 62, 80 or 140, 142 are activated to provide a low loss path to the antenna 16.

Figure 7A:
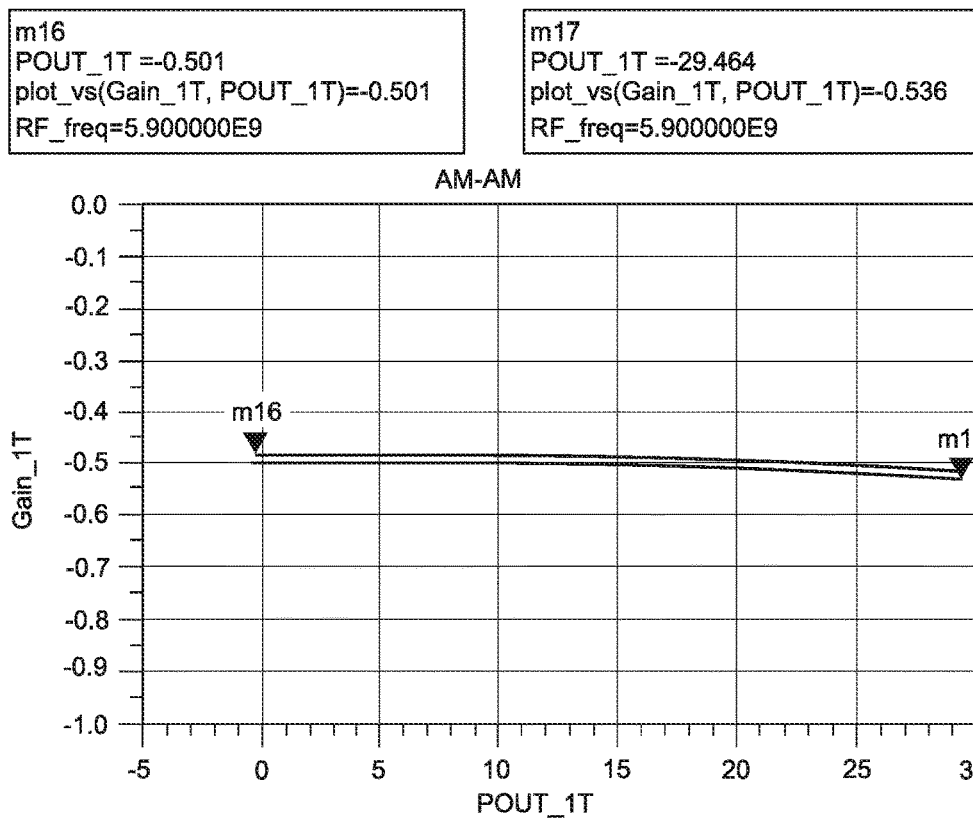
FIGS. 7A and 7B are plots showing the linearity of the first embodiment of the RF transmit-receive switch (AM-AM in [dB] and AM-PM in [degree])
Figure 7B:
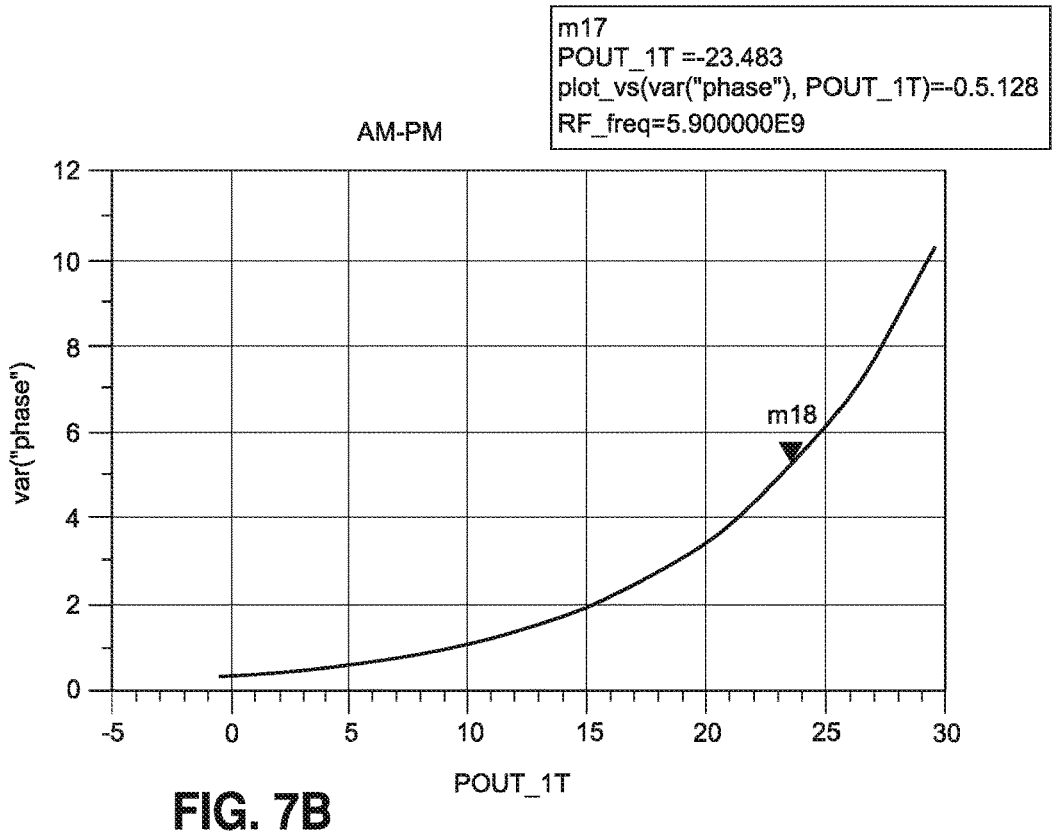

FIGS. 7A and 7A are graphs showing the linearity of a simulation of the first embodiment of the RF transmit-receive switch 18a in the transmit mode with the first and second transmit transistor switches 62, 80 being activated at an operating frequency of 5.9 GHz. Additionally, the power handling capability of the RF transmit-receive switch 18a is illustrated. The graph of FIG. 7A is of amplitude-amplitude component (AM-AM), and P(0.3 dB) power is 20 dBM with a phase shift of 10 degrees. The graph of FIG. 7B shows the amplitude-phase component, and is approximately 5 degrees at 23.4 dBm.

Figure 8A:
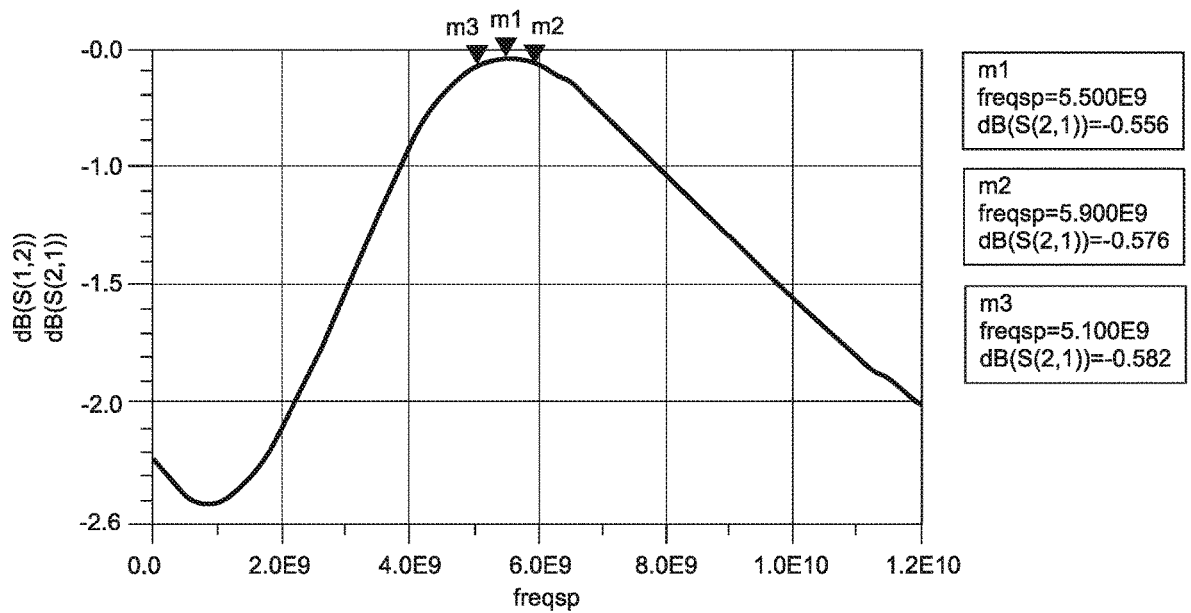
FIGS. 8A and 8B are plots showing a simulated insertion loss and rejection characteristics of the first embodiment of the RF transmit-receive switch in a transmit mode.
Figure 8B:
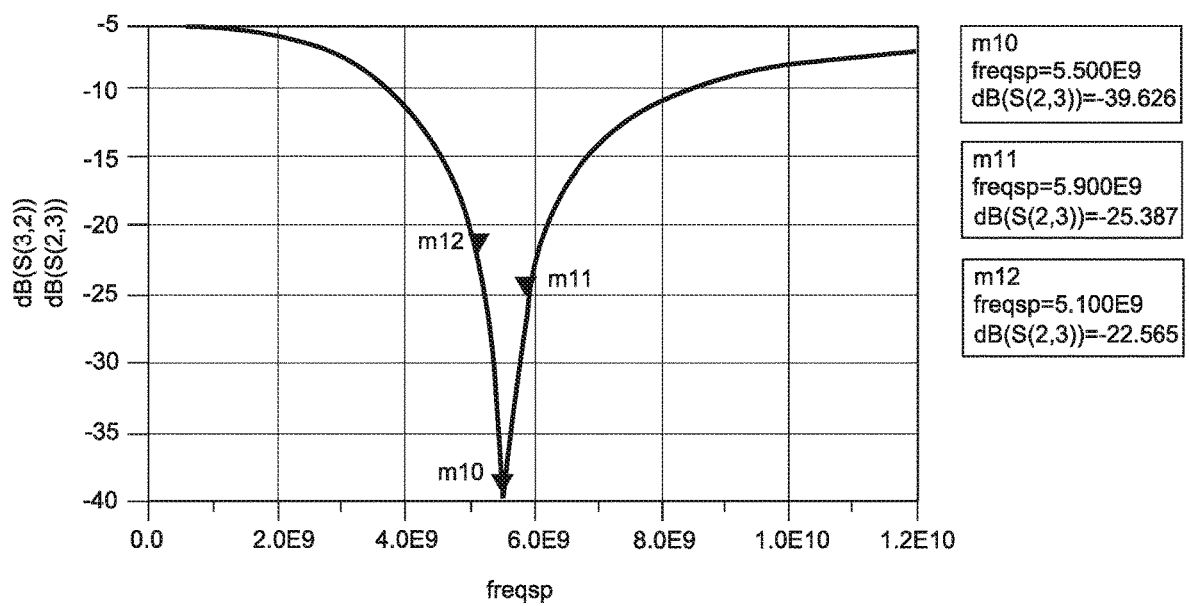
Figure 9A:
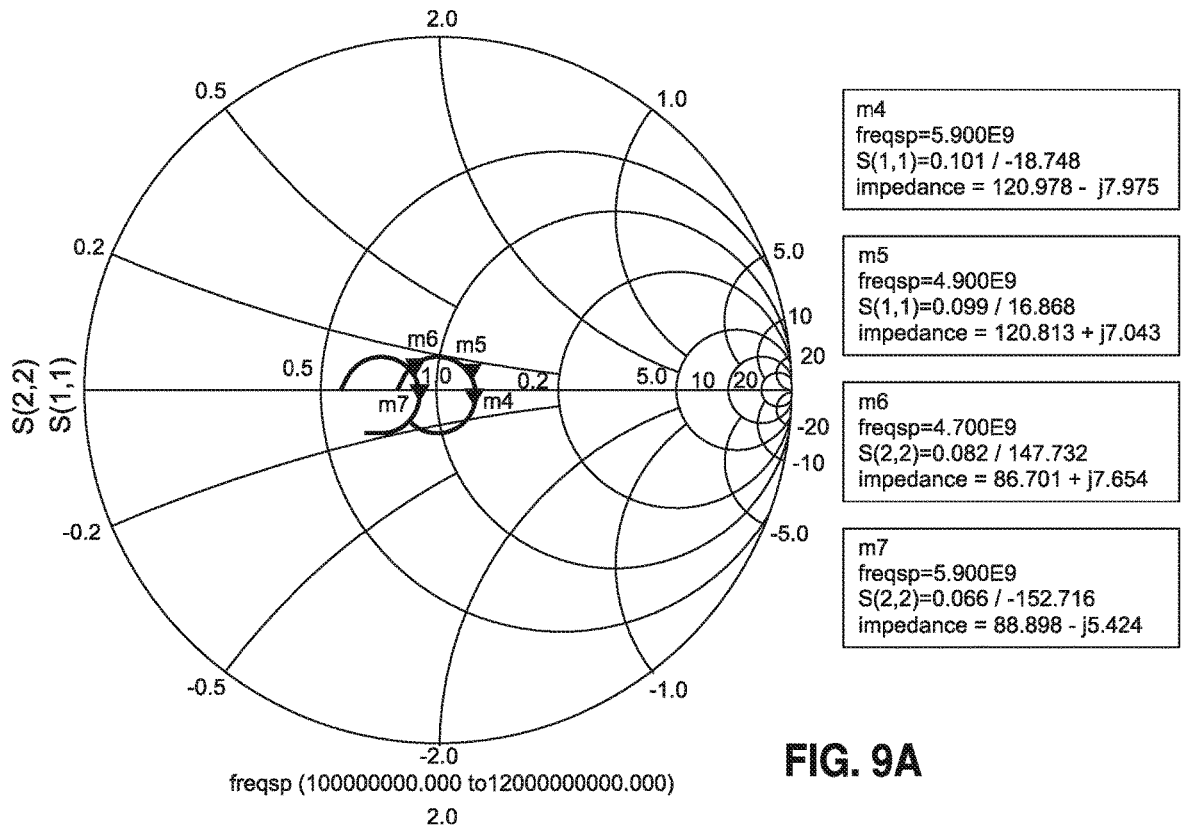
FIGS. 9A and 9B are Smith charts showing the return loss of the first embodiment of the RF transmit-receive switch in the transmit mode.
Figure 9B:
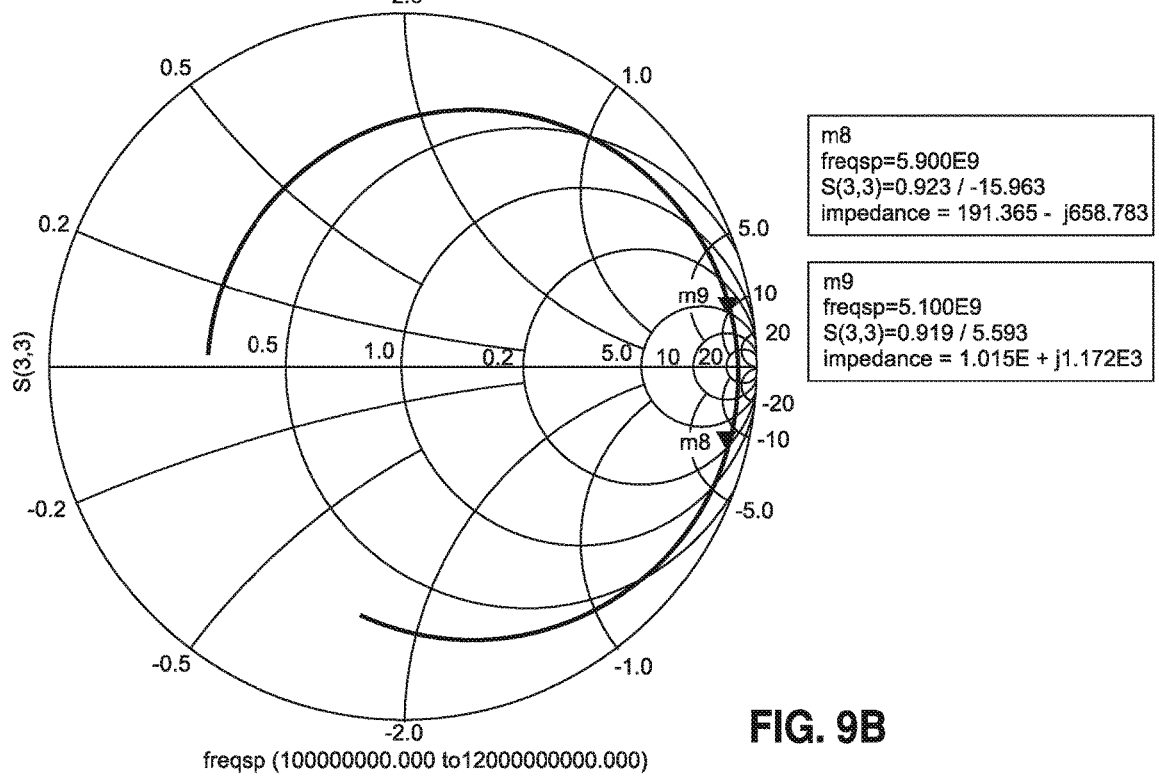

Referring now FIGS. 8A, 8B, 9A, and 9B, simulated signal insertion loss, rejection and return loss performance of the first embodiment of the RF transmit-receive switch 18a in a transmit mode are plotted. FIG. 8A plots the forward transmission coefficient/attenuation of the transmit signal on the transmit differential port 56 to the antenna port 54 (S21) during the transmit mode over a frequency range. As referenced in this context, the transmit mode is understood to refer to the first and second transmit transistor switches 62, 80 being activated and the first and second receive transistor switches 90, 92 being deactivated. At 5.1 GHz, the attenuation is 0.582 dB (marker m3), at 5.5 GHz, the attenuation is 0.556 dB (marker m1) and at 5.9 GHz, the attenuation is 0.576 dB (marker m2). FIG. 8B plots the rejection of a receive signal, that is, the signal on the receive differential port 58, in the transmit mode over a frequency range. At 5.1 GHz, the attenuation is 22.5 dB (marker m12), at 5.5 GHz, the attenuation is 39.626 dB (marker m10), and at 5.9 GHz, the attenuation is 25.387 dB (marker m11). The Smith charts of FIGS. 9A and 9B show the return loss in the transmit mode for the first embodiment of the RF transmit-receive switch 18a at three different ports.

Figure 10A:
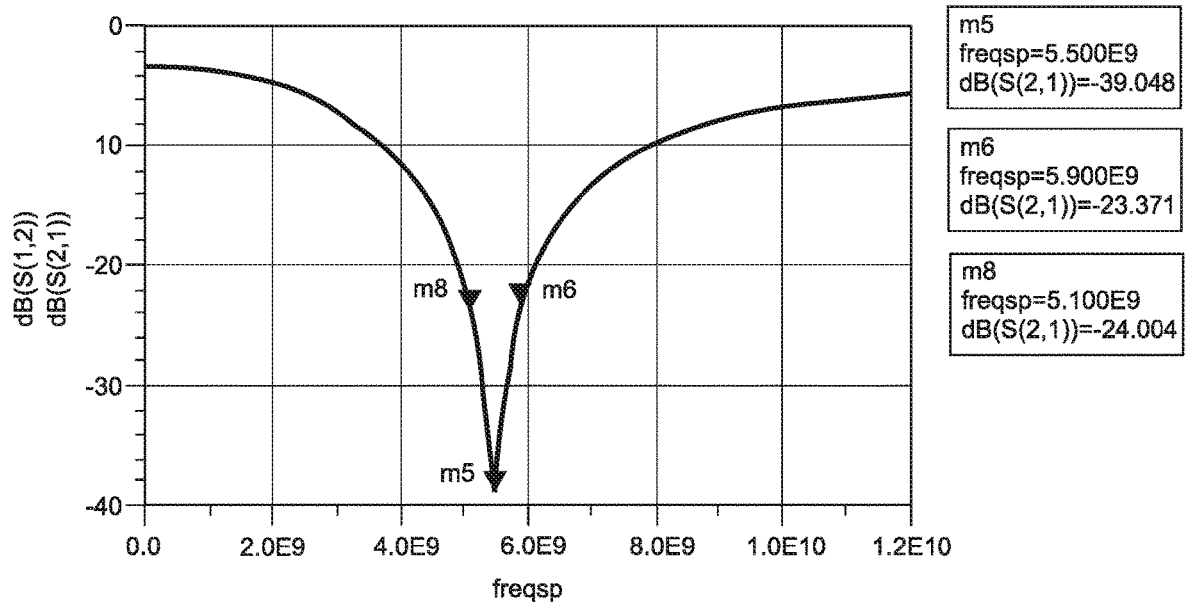
FIGS. 10A and 10B are plots showing a simulated insertion loss and rejection characteristics of the first embodiment of the RF transmit-receive switch in a receive mode.
Figure 10B:
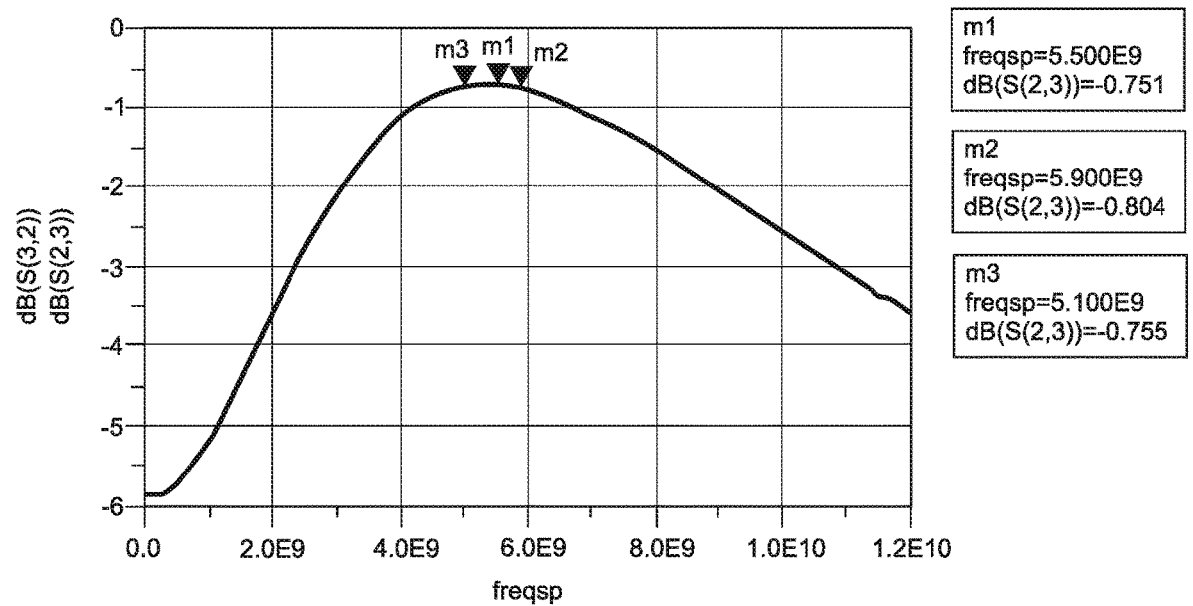
Figure 11A:
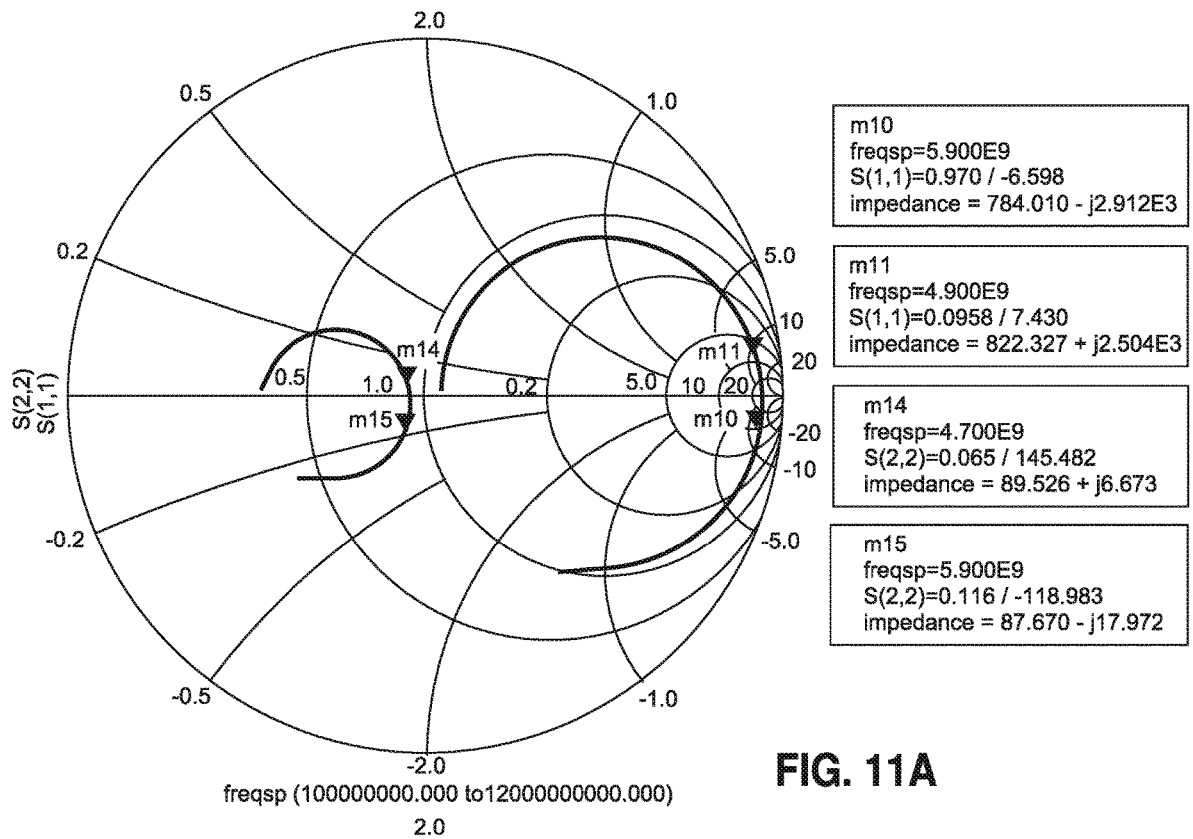
FIGS. 11A and 11B are Smith charts showing the return loss of the first embodiment of the RF transmit-receive switch in the receive mode.
Figure 11B:
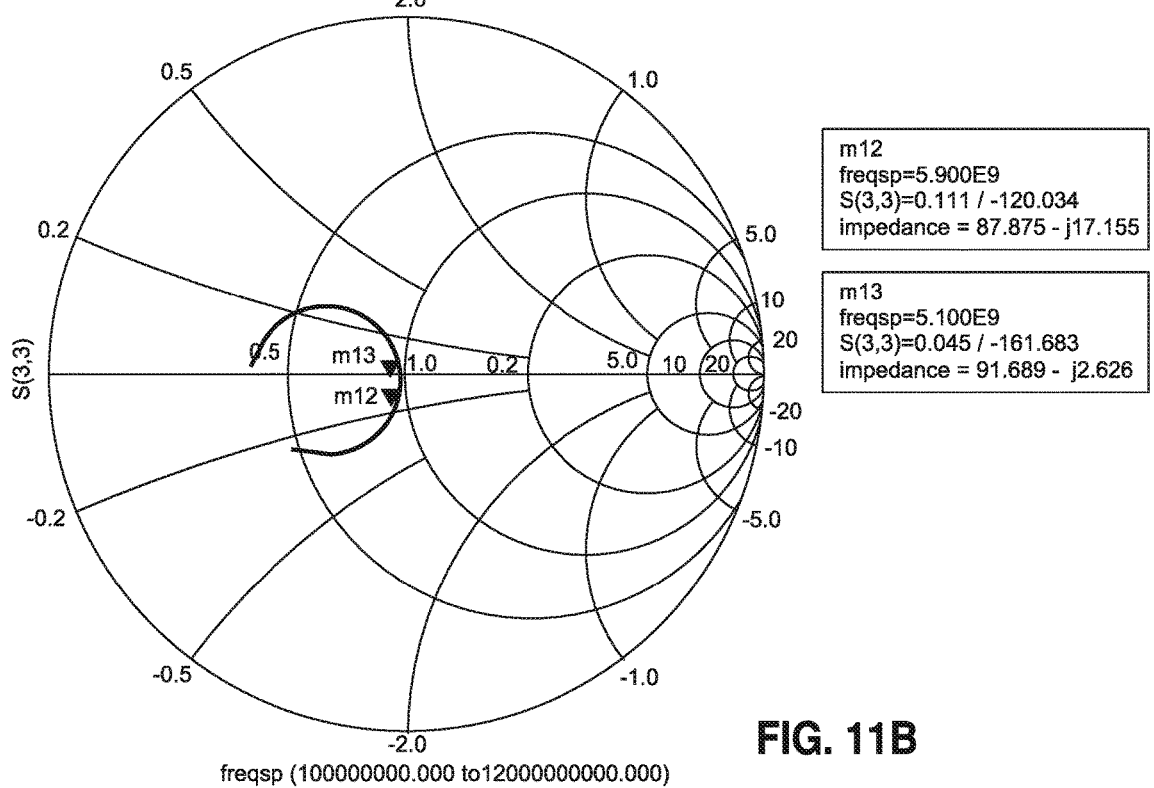

FIGS. 10A, 10B, 11A, and 11B show the simulated signal insertion loss, rejection and return loss performance of the first embodiment of the RF transmit-receive switch 18a in a receive mode. Specifically, FIG. 10A shows the forward transmission coefficient/attenuation of a signal on the transmit differential port 56 to the antenna port 54 (S21) during the receive mode over a frequency range. As referenced in this context, the receive mode is understood to refer to the first and second receive transistor switches 90, 92 being deactivated. At 5.1 GHz, the attenuation is 24.004 dB (marker m8), at 5.5 GHz, the attenuation is 39.048 dB (marker m5) and at 5.9 GHz, the attenuation is 23.371 dB (marker m6). FIG. 10B plots the attenuation of a receive signal, that is, the signal on the receive differential port 58, in the receive mode over a frequency range. At 5.1 GHz, the attenuation is 0.755 dB (marker m3), at 5.5 GHz, the attenuation is 0.751 dB (marker m1), and at 5.9 GHz, the attenuation is 0.804 dB (marker 2). The Smith charts of FIGS. 11A and 11B show the return loss in the receive mode for the first embodiment of the RF transmit-receive switch 18a at three different ports.

Figure 12A:
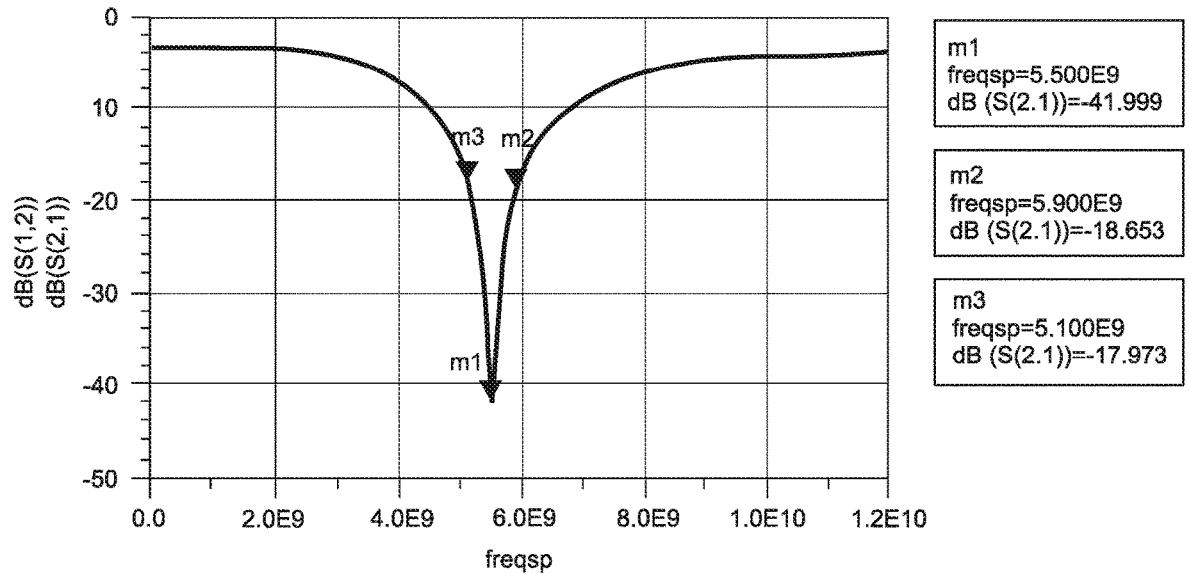
FIGS. 12A and 12B are plots showing simulated insertion loss and rejection characteristics of the first embodiment of the RF transmit-receive switch with both transmit and receive transistor switches being deactivated
Figure 12B:
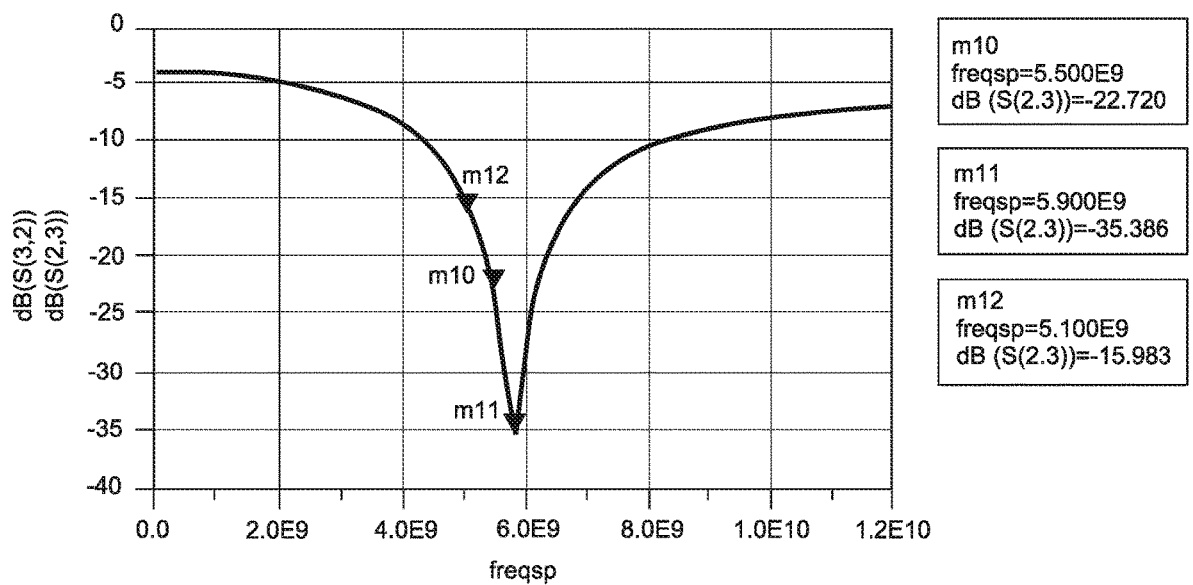
Figure 13A:
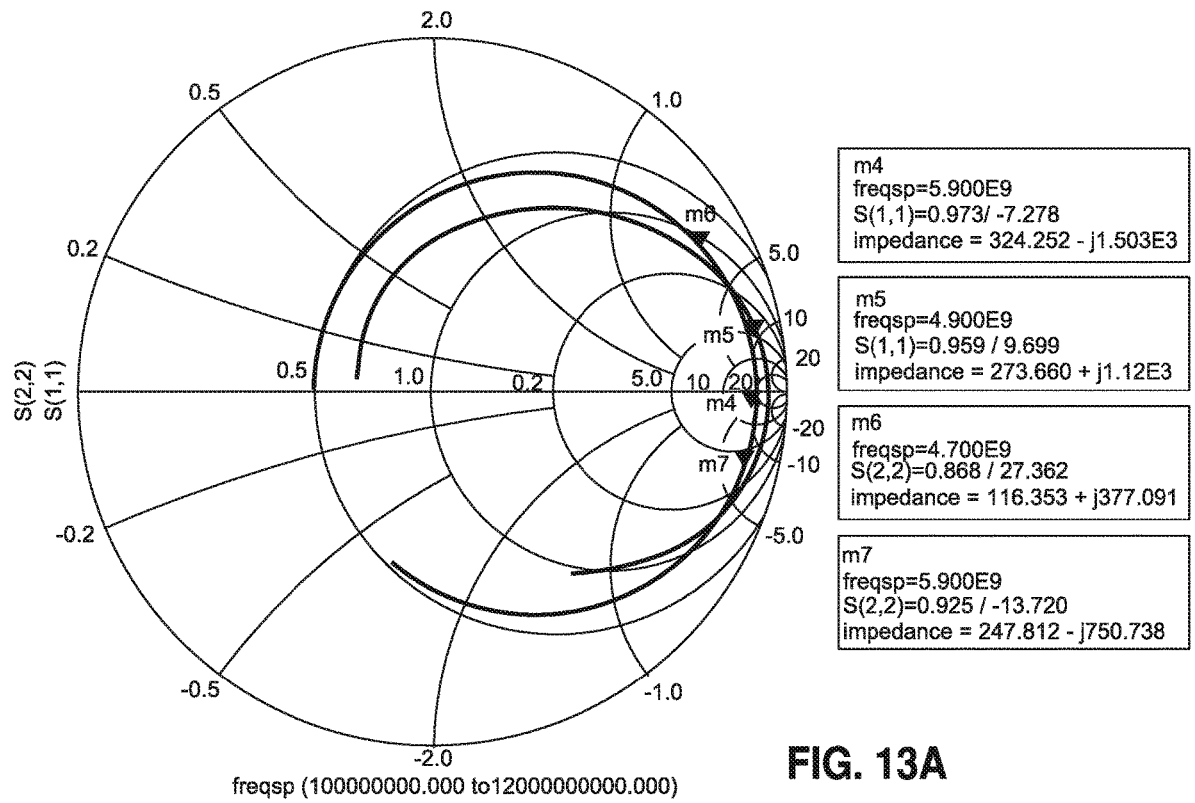
FIGS. 13A and 13B are Smith charts showing the return loss of the first embodiment of the RF transmit-receive switch with both transmit and receive transistor switches being deactivated.
Figure 13B:
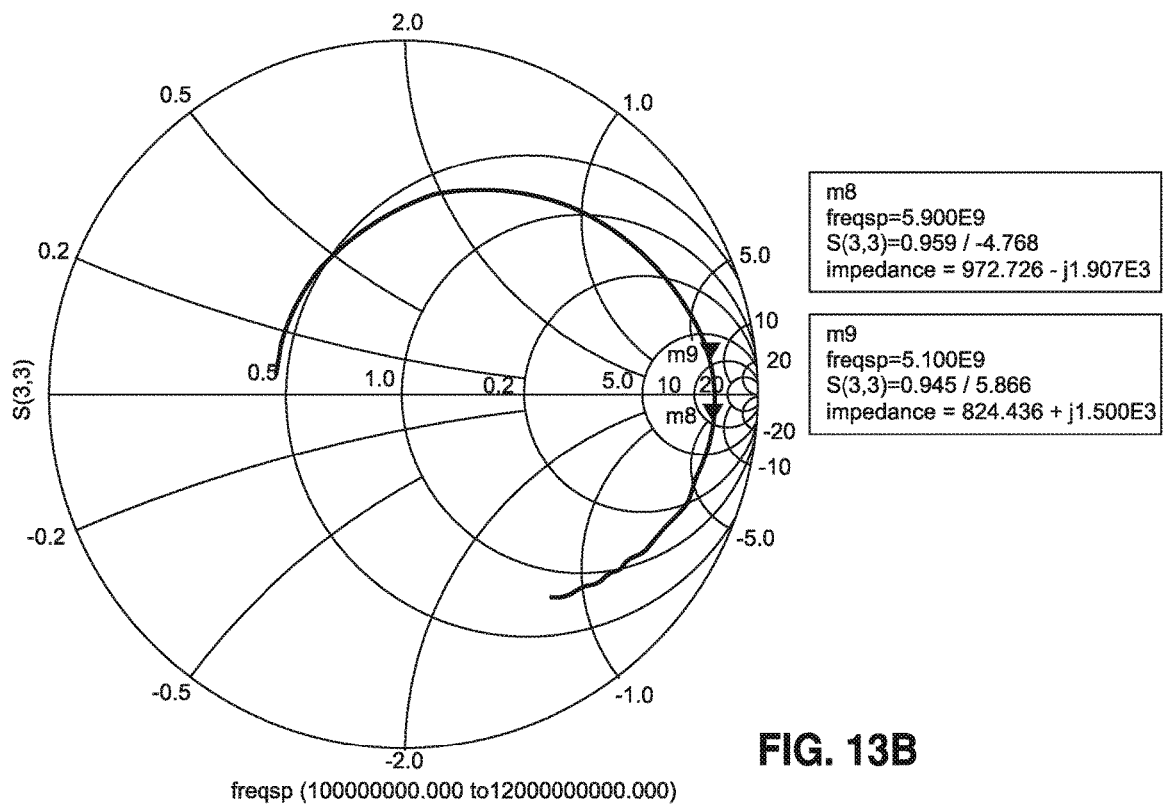

FIGS. 12A, 12B, 13A, and 13B show the simulated signal insertion loss, rejection and return loss performance of the first embodiment of the RF transmit-receive switch 18a with the first and second transmit transistor switches 62, 80 and the first and second receive transistor switches 90, 92 being deactivated. FIG. 12A shows the forward transmission coefficient/attenuation of a signal on the transmit differential port 56 to the antenna port 54 (S21) over a frequency range. At 5.1 GHz, the attenuation is 17.973 dB (marker m3), at 5.5 GHz, the attenuation is 41.999 dB (marker m1) and at 5.9 GHz, the attenuation is 18.653 dB (marker m2). FIG. 12B plots the attenuation of a receive signal, that is, the signal on the receive differential port 58 over a frequency range. At 5.1 GHz, the attenuation is 15.983 dB (marker m12), at 5.5 GHz, the attenuation is 22.720 dB (marker m10), and at 5.9 GHz, the attenuation is 35.386 dB (marker m11). Thus, the transmit side rejection is approximately 18 dB to 40 dB, while the receive side rejection is approximately 16 dB to 35 dB. The Smith charts of FIGS. 13A and 13B show the return loss for the first embodiment of the RF transmit-receive switch 18a at three different ports.

Figure 14:
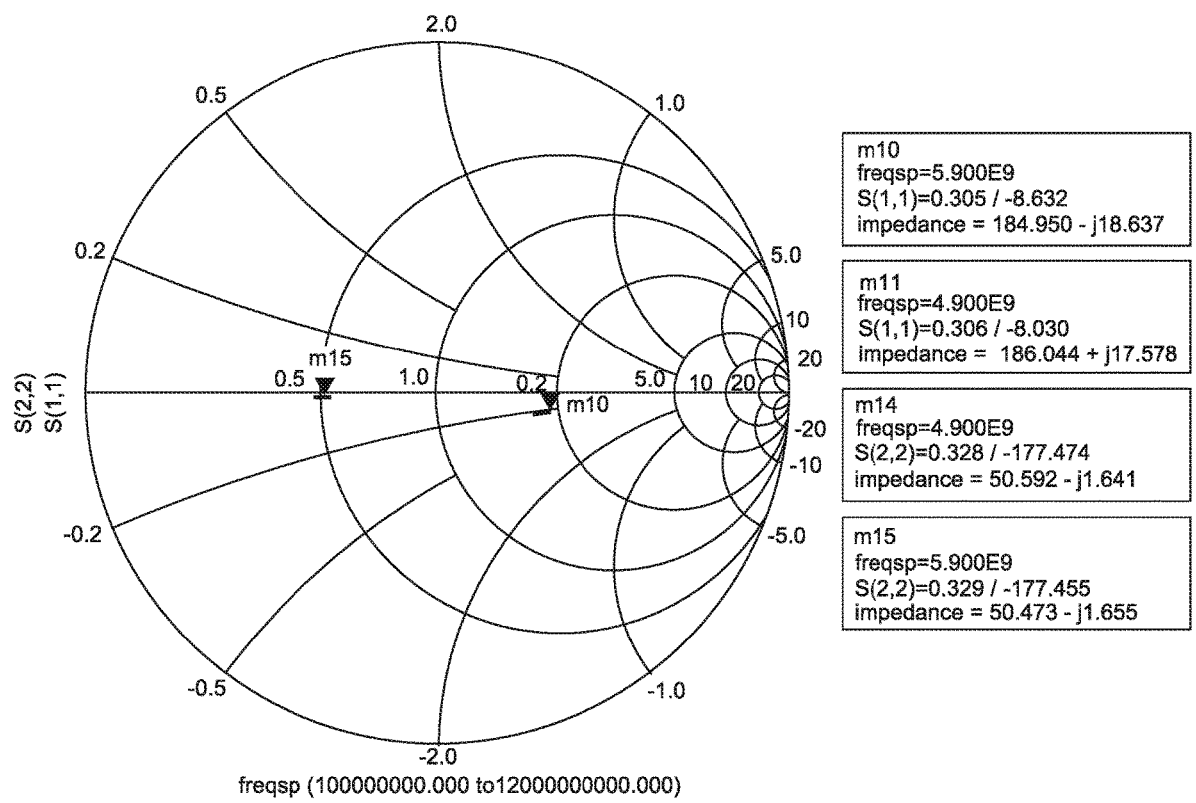
FIG. 14 is a Smith chart showing the impedance transformation in the third embodiment of the RF transmit-receive switch.
Figure 15:
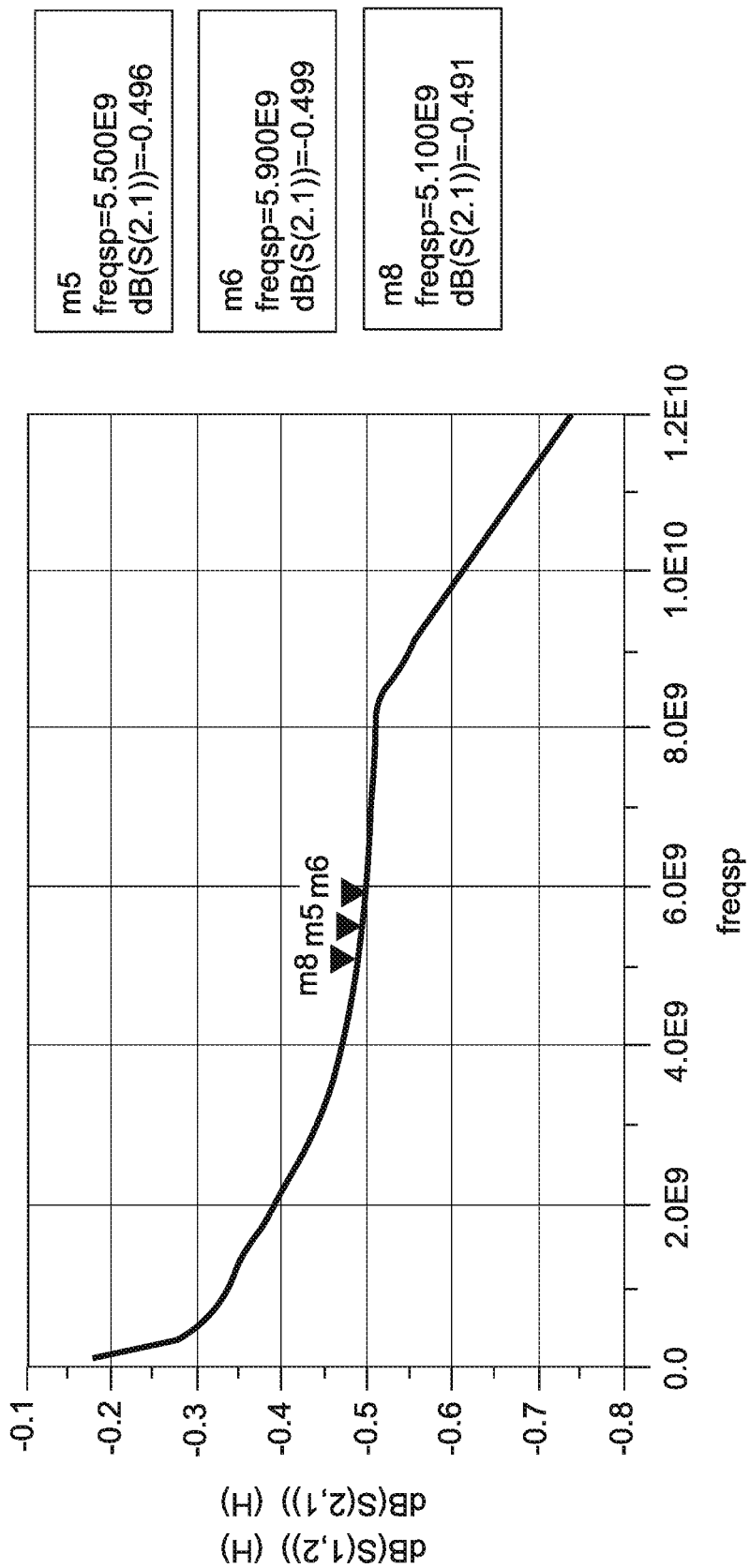
FIG. 15 is a plot showing simulated insertion loss characteristics of the third embodiment of the RF transmit-receive switch.

Referring to FIG. 14, the Smith chart shows an impedance transformation from 50 Ohm to 180 Ohm and vice versa in the third embodiment of the RF transmit-receive switch 18c. The graph of FIG. 15 plots the insertion loss of the third embodiment of the RF transmit-receive switch 18c, Specifically, at 5.1 GHz, the attenuation is 0.491 dB (marker m8), at 5.5 GHz, the attenuation is 0.496 dB (marker m5) and at 5.9 GHz, the attenuation is 0.499 dB (marker m6).

Figure 16:
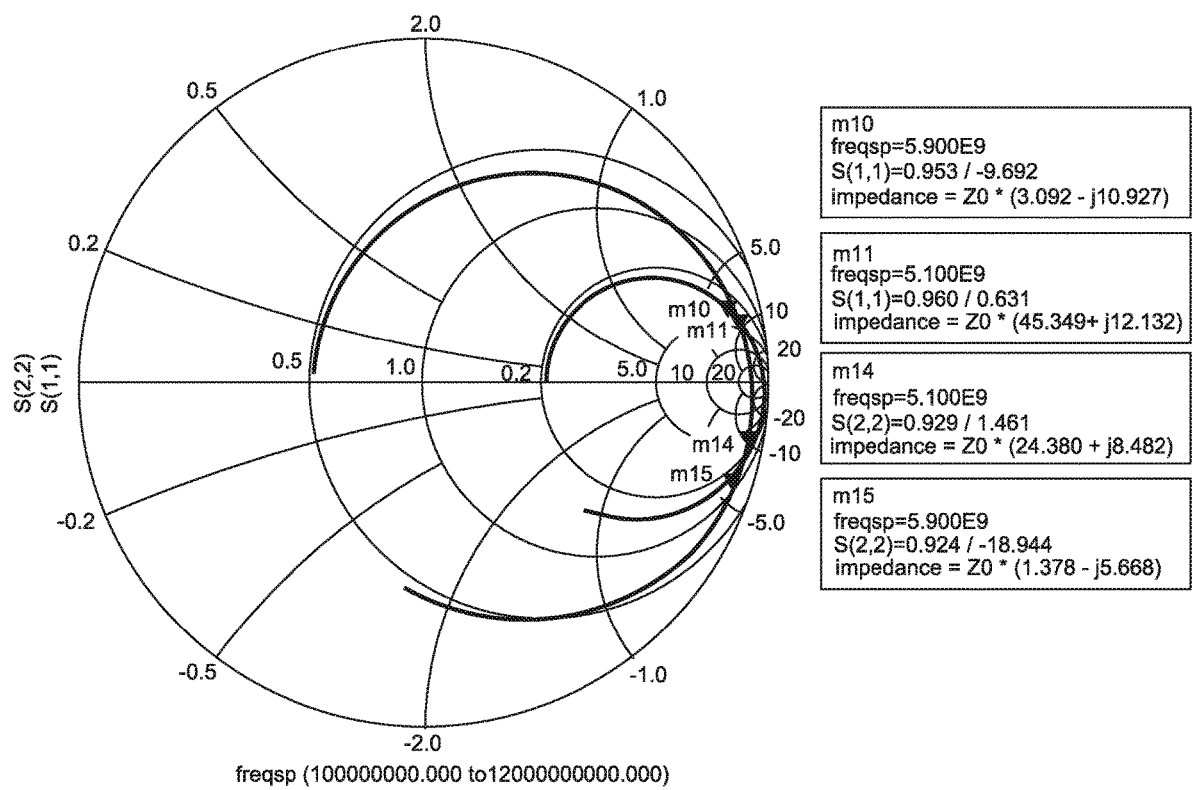
FIG. 16 is a Smith chart showing the impedances of the transmit and receive ports of the third embodiment of the RF transmit-receive switch during the transmit mode.
Figure 17:
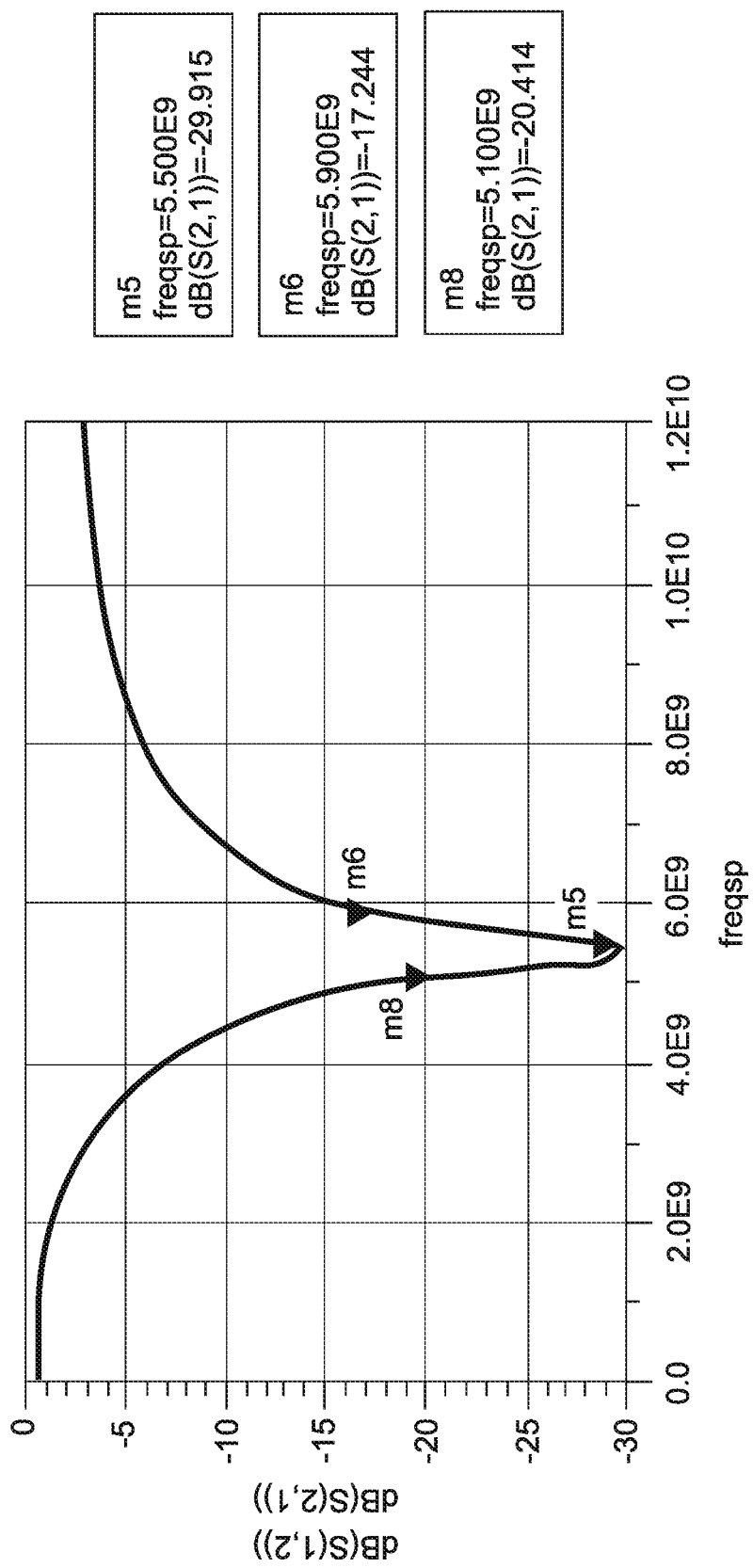
FIG. 17 is a plot showing simulated rejection characteristics of the third embodiment of the RF transmit-receive switch in the transmit mode.

The Smith chart of FIG. 16 shows the impedances of the transmit and receive ports of the third embodiment of the RF transmit-receive switch during the transmit mode. Furthermore, FIG. 17 shows that the rejection of the receive signal, e.g., the signal on the receive differential port 58 in the transmit mode, is greater than 17 dB across the 5.1 GHz to 5.9 GHz band.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show details of these embodiments with more particularity than is necessary for the fundamental understanding of the present disclosure, the description taken with the drawings making apparent to those skilled in the art how the several forms of the present disclosure may be embodied in practice.

What is claimed is:

1. A radio frequency transmit-receive switch comprising:
a differential transmit circuit including a first transmit switch and a second transmit switch each connected to a transmit transformer;
a differential receive circuit including a first receive switch and a second receive switch each connected to a receive transformer; and
a balun connected to the transmit transformer of the differential transmit circuit and the receive transformer of the differential receive circuit, and defining an antenna port.

2. The radio frequency transmit-receive switch of claim 1 wherein the transmit transformer includes a primary winding with a first pair of terminals, and a secondary winding with a second pair of terminals.

3. The radio frequency transmit-receive switch of claim 2 wherein the first transmit switch includes a first transmit transistor connected across the first pair of terminals of the primary winding.

4. The radio frequency transmit-receive switch of claim 2 wherein the second transmit switch includes a second transmit transistor connected across the second pair of terminals of the secondary winding.

5. The radio frequency transmit-receive switch of claim 1 wherein the receive transformer includes a primary winding with a first pair of terminals, and a secondary winding with a second pair of terminals.

6. The radio frequency transmit-receive switch of claim 5 wherein the first receive switch includes a first receive transistor connected across the first pair of terminals of primary winding.

7. The radio frequency transmit-receive switch of claim 5 wherein the second receive switch includes a second receive transistor connected across the second pair of terminals of the primary winding.

8. The radio frequency transmit-receive switch of claim 1 wherein the balun is defined by a first winding and a second winding.

9. The radio frequency transmit-receive switch of claim 8 wherein the transmit transformer and the receive transformer are connected to the second winding of the balun.

10. The radio frequency transmit-receive switch of claim 8 wherein the first winding of the balun is connected to the antenna port.

11. The radio frequency transmit-receive switch of claim 1 further comprising a control module connected to the first transmit switch, the second transmit switch, the first receive switch, and the second receive switch for selective activation and deactivation thereof.

12. A radio frequency switch circuit comprising:
a transmit switch circuit;
a receive switch circuit;
a combination differential transmit-receive switch circuit including a first switch and a second switch each connected to a transformer;

a balun connected to the transmit switch circuit, the receive switch circuit, and the combination differential transmit-receive switch circuit, and defining an antenna port.

13. The radio frequency switch circuit of claim 12 wherein the transformer includes a primary winding with a first pair of terminals, and a secondary winding with a second pair of terminals.

14. The radio frequency switch circuit of claim 13 wherein the balun is defined by a first winding connected to the antenna port, and a second winding.

15. The radio frequency switch circuit of claim 14 wherein one of the first pair of terminals of the primary winding of the transformer, and one of the second pair of terminals of the secondary winding of the transformer are each connected to the second winding of the balun.

16. The radio frequency switch circuit of claim 12 wherein the transmit switch circuit and the receive switch circuit are connected to a respective transmitter output and receiver output of a first radio frequency transceiver module for a first operating mode.

17. The radio frequency switch circuit of claim 16 wherein the combination differential transmit-receive switch circuit is connected a first combination transmit-receive port and a second combination transmit-receive port of a second radio frequency transceiver module for a second operating mode.

18. A radio frequency switch circuit comprising:
a transmit switch circuit with a first input switch for a first differential input, a second input switch for a second differential input, and transmit transformer with a first winding connected to the first input switch and a second winding connected to the second input switch;
a receive switch circuit with a first output switch for a first differential output, a second output switch for a second differential output, and a receive transformer with a first winding connected to the first output switch and a second winding connected to the second output switch; and
a balun connected to the transmit switch circuit and the receive switch circuit.

19. The radio frequency front end circuit of claim 18 wherein the balun is defined by a first winding connected to an antenna port, and a second winding connected to the transmit switch circuit and the receive switch circuit.

20. The radio frequency front end circuit of claim 19 wherein the second winding of the balun is defined by a first end and a second end, the transmit switch circuit being connected to the first end of the second winding of the balun and the receive switch circuit being connected to the second end of the second winding of the balun.

* * * * *